US012654106B2

(12) United States Patent
Ikebata

(10) Patent No.: US 12,654,106 B2
(45) Date of Patent: Jun. 16, 2026

(54) COMPUTER-READABLE NON-TRANSITORY STORAGE MEDIUM HAVING GAME PROGRAM STORED THEREIN, GAME SYSTEM, GAME APPARATUS, AND GAME PROCESSING METHOD

(71) Applicant: NINTENDO CO., LTD., Kyoto (JP)

(72) Inventor: Yoshihito Ikebata, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 720 days.

(21) Appl. No.: 18/148,822

(22) Filed: Dec. 30, 2022

(65) Prior Publication Data

US 2023/0241510 A1 Aug. 3, 2023

(30) Foreign Application Priority Data

Jan. 28, 2022 (JP) ................................. 2022-012127

(51) Int. Cl.
| | |
|---|---|
| *A63F 13/69* | (2014.01) |
| *A63F 13/56* | (2014.01) |
| *A63F 13/67* | (2014.01) |
| *A63F 13/798* | (2014.01) |
| *A63F 13/812* | (2014.01) |
| *A63F 13/828* | (2014.01) |

(52) U.S. Cl.
CPC .............. *A63F 13/69* (2014.09); *A63F 13/56* (2014.09); *A63F 13/67* (2014.09); *A63F 13/798* (2014.09); *A63F 13/812* (2014.09); *A63F 13/828* (2014.09)

(58) Field of Classification Search
CPC .......... A63F 13/69; A63F 13/56; A63F 13/67; A63F 13/798; A63F 17/812; A63F 13/828
See application file for complete search history.

(56) References Cited

U.S. PATENT DOCUMENTS

| | | | |
|---|---|---|---|
| 2007/0244878 A1* | 10/2007 | Hulme | .................... A63F 13/30 |
| | | | 707/999.005 |
| 2015/0258455 A1 | 9/2015 | Lee et al. | |
| 2017/0357391 A1* | 12/2017 | Galfond | .............. G07F 17/3288 |

FOREIGN PATENT DOCUMENTS

| | | |
|---|---|---|
| JP | 2016064154 A | 4/2016 |
| JP | 2020151088 A | 9/2020 |

OTHER PUBLICATIONS

Notice of Reasons for Refusal dated Sep. 5, 2023 received in Japanese Patent Application No. JP 2022-012127.

* cited by examiner

*Primary Examiner* — Thomas H Henry
(74) *Attorney, Agent, or Firm* — Scully, Scott, Murphy & Presser, P.C.

(57) ABSTRACT

A competitive sports game in which a team of a first club that at least one user joins and a team of a second club are caused to compete against each other is executed. Here, at least the first club is associated with a rank that is information regarding a degree of growth of the club. The competitive sports game is executed such that an advantageous effect corresponding to a level of the rank is given to the team of the first club.

26 Claims, 13 Drawing Sheets

F I G.  1
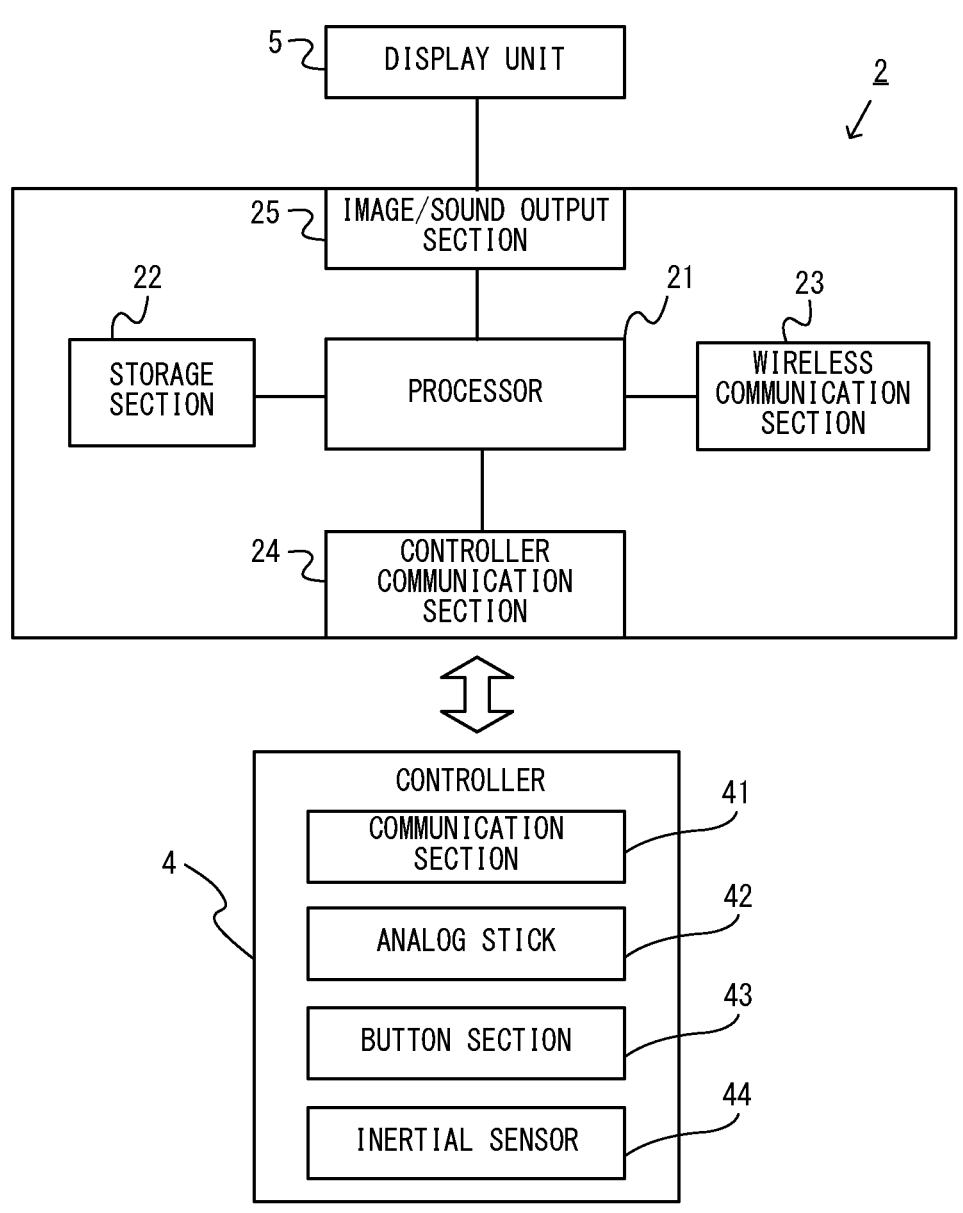

F I G. 2
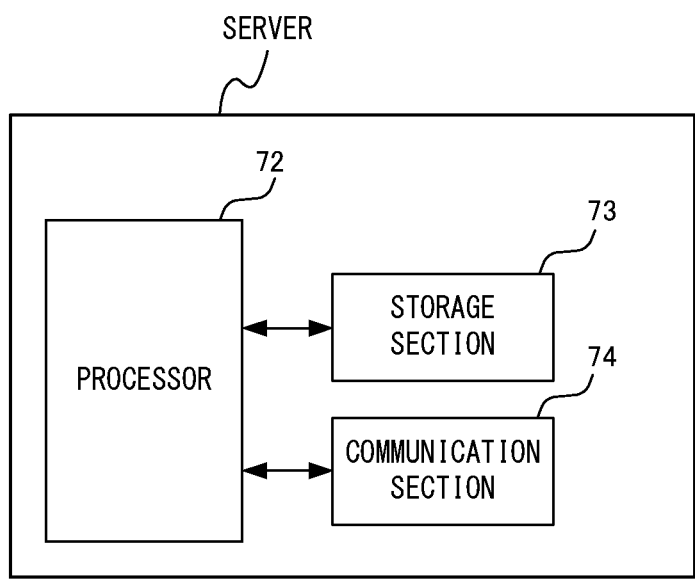

F I G.  3
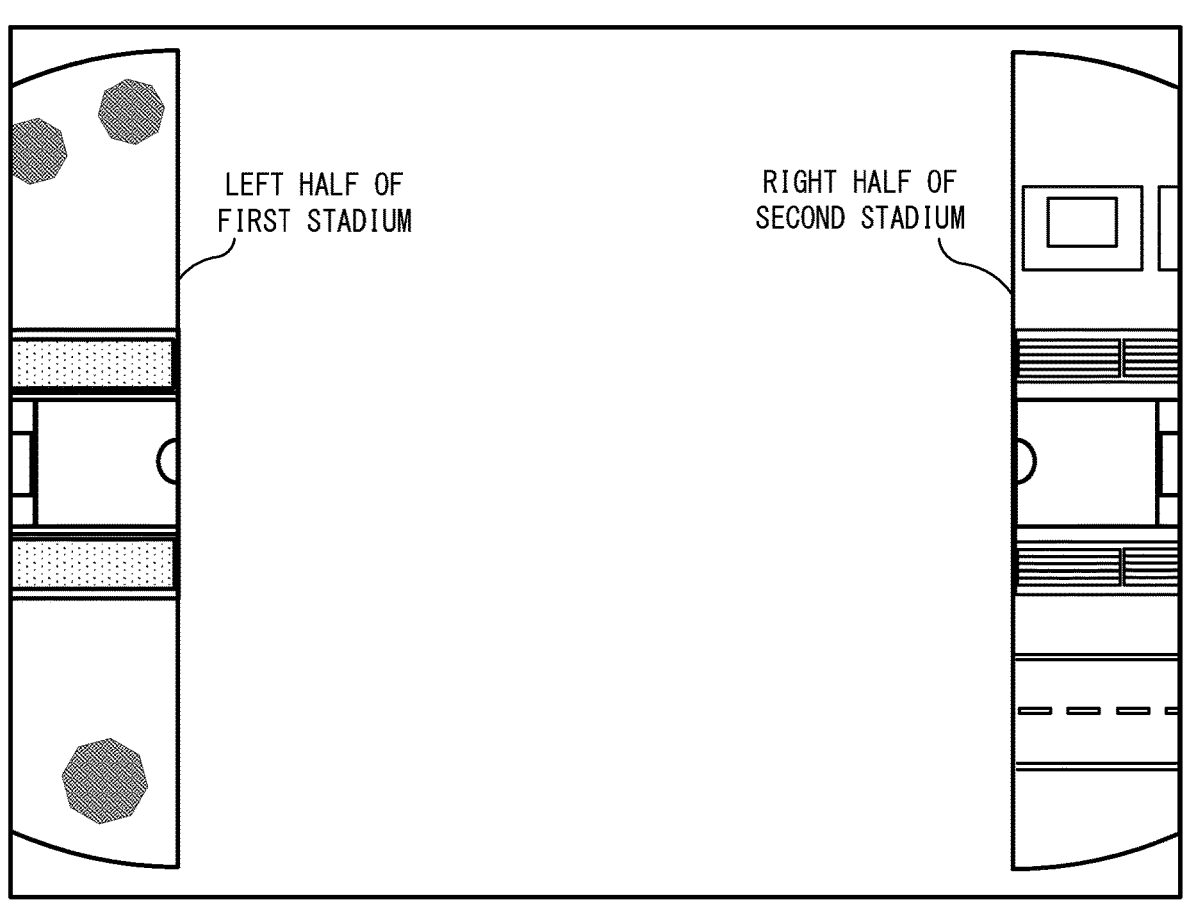
LEFT HALF OF
FIRST STADIUM
RIGHT HALF OF
SECOND STADIUM

F I G.  4
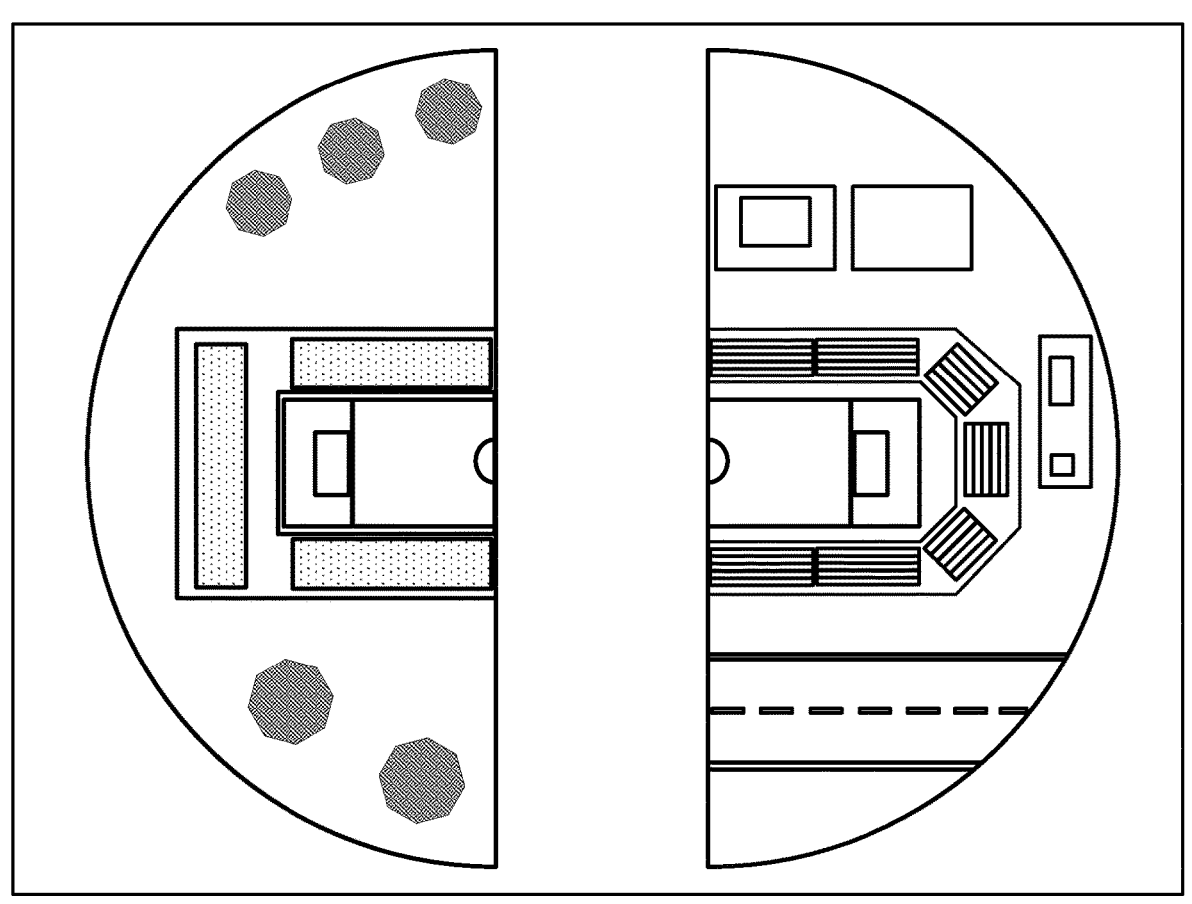

F I G.  5
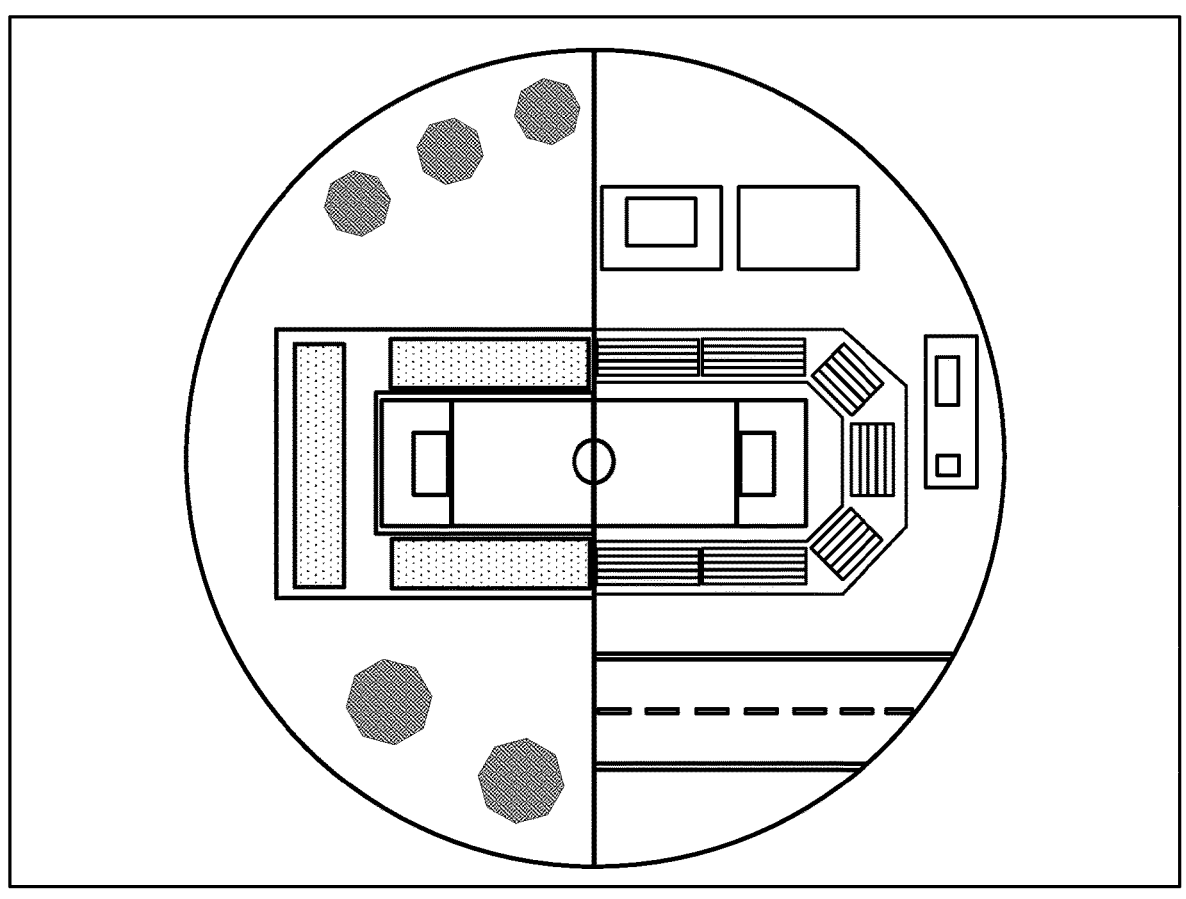

F I G.  6
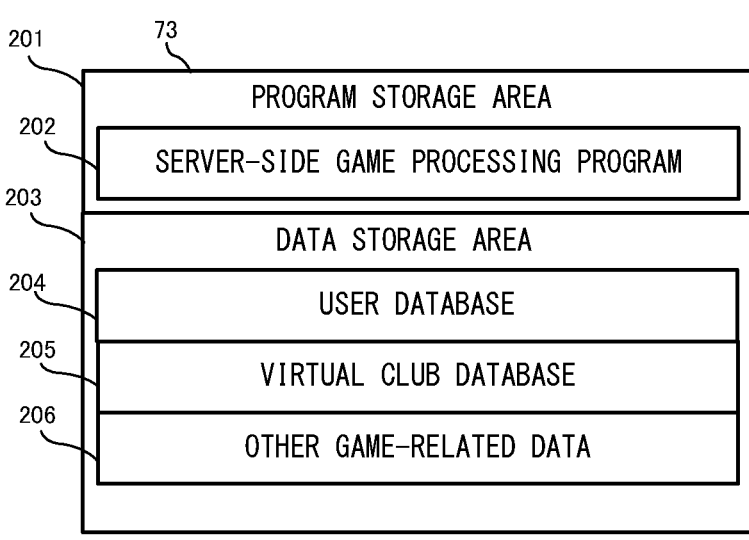
F I G.  7
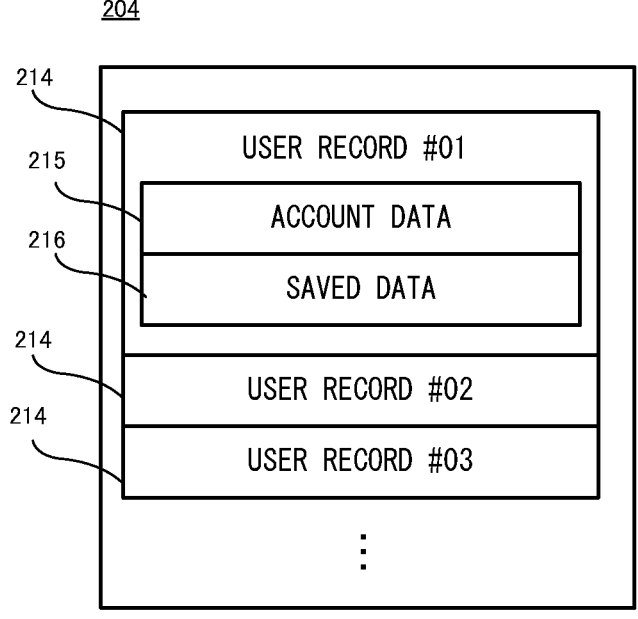

F I G.　8
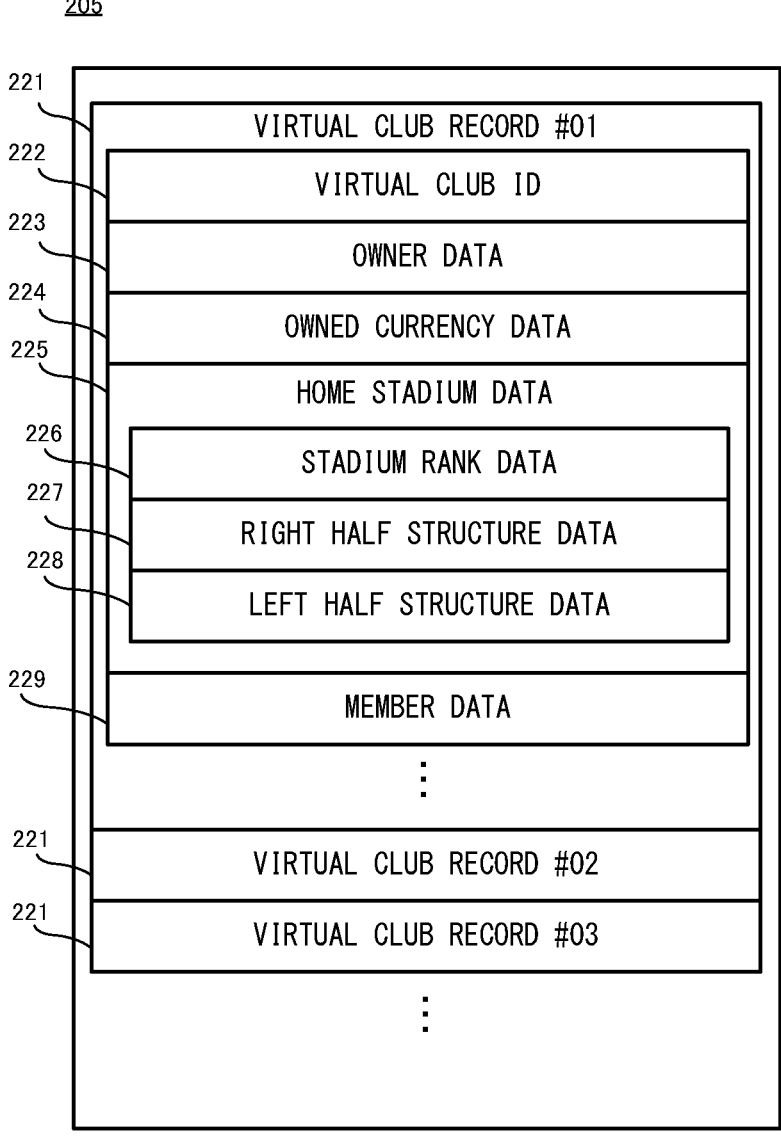

F I G.   9
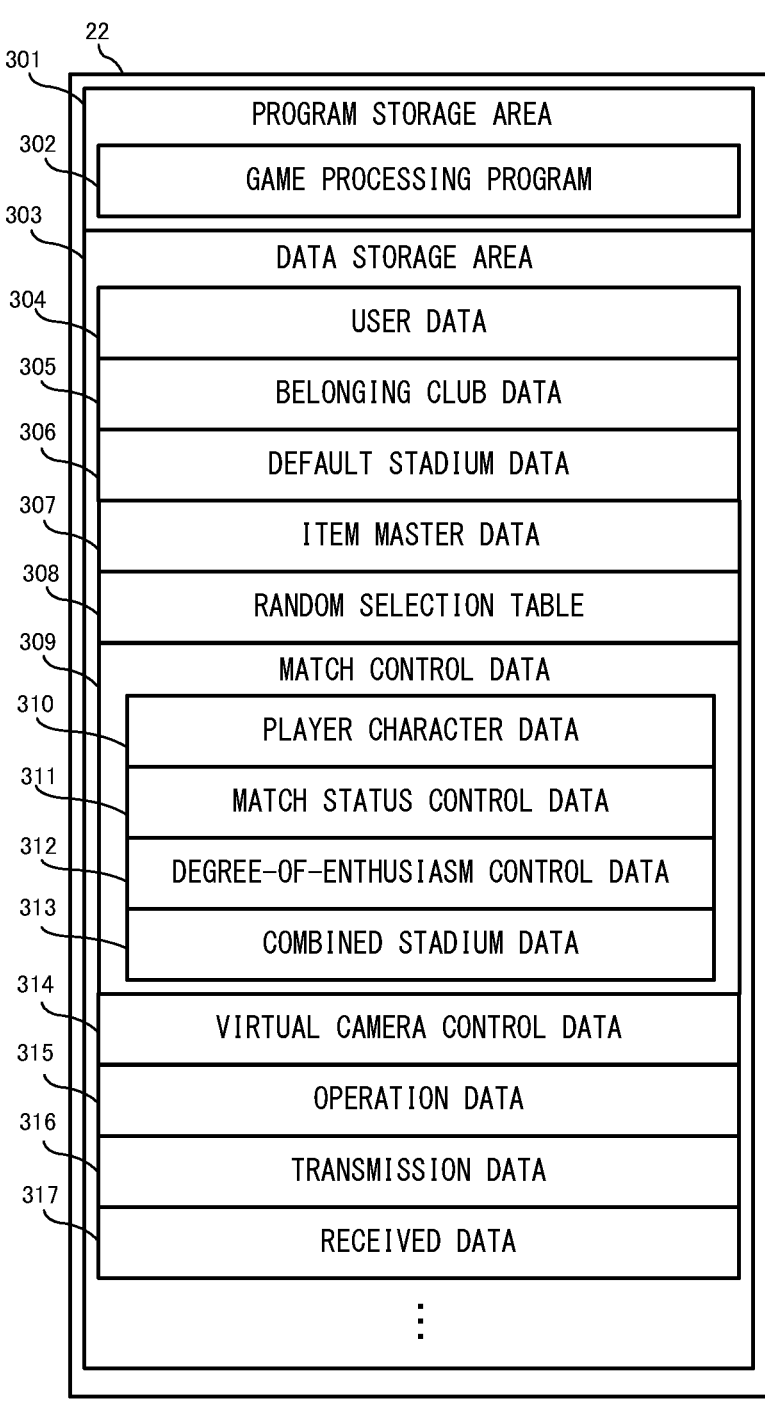

F I G.  1 0
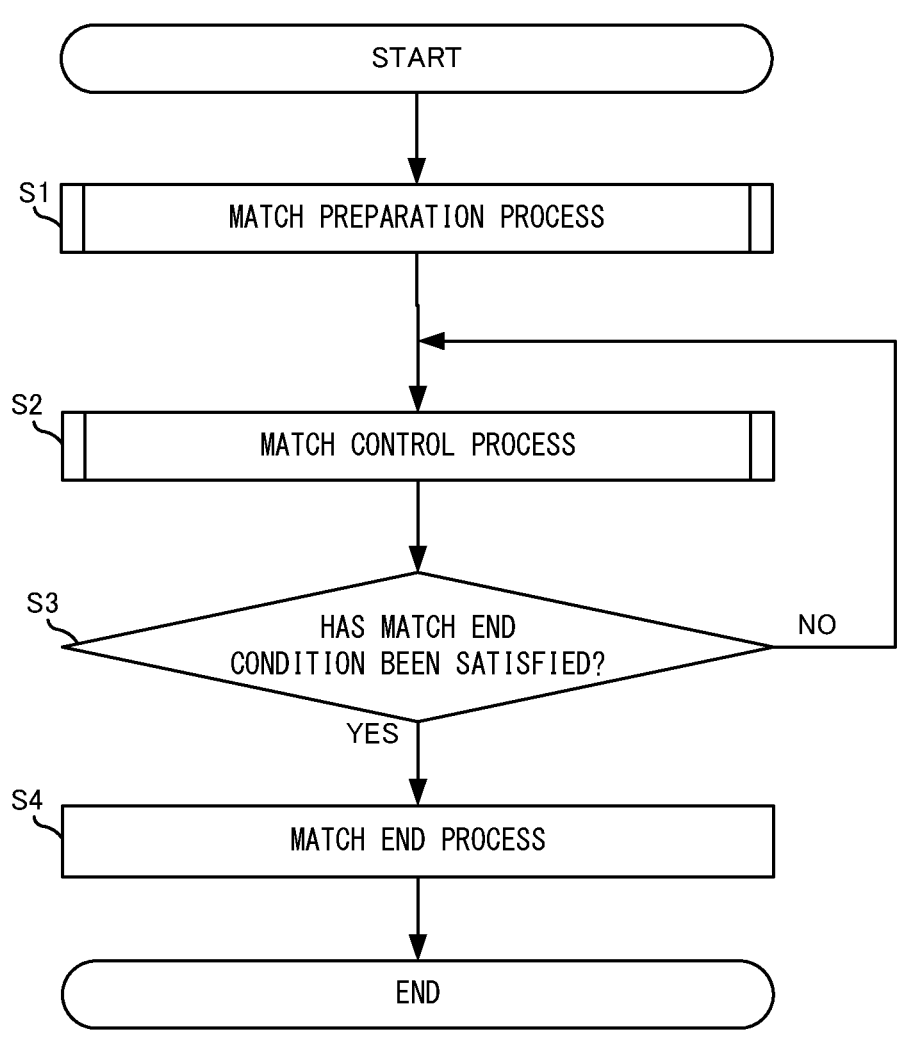

F I G.  1 1
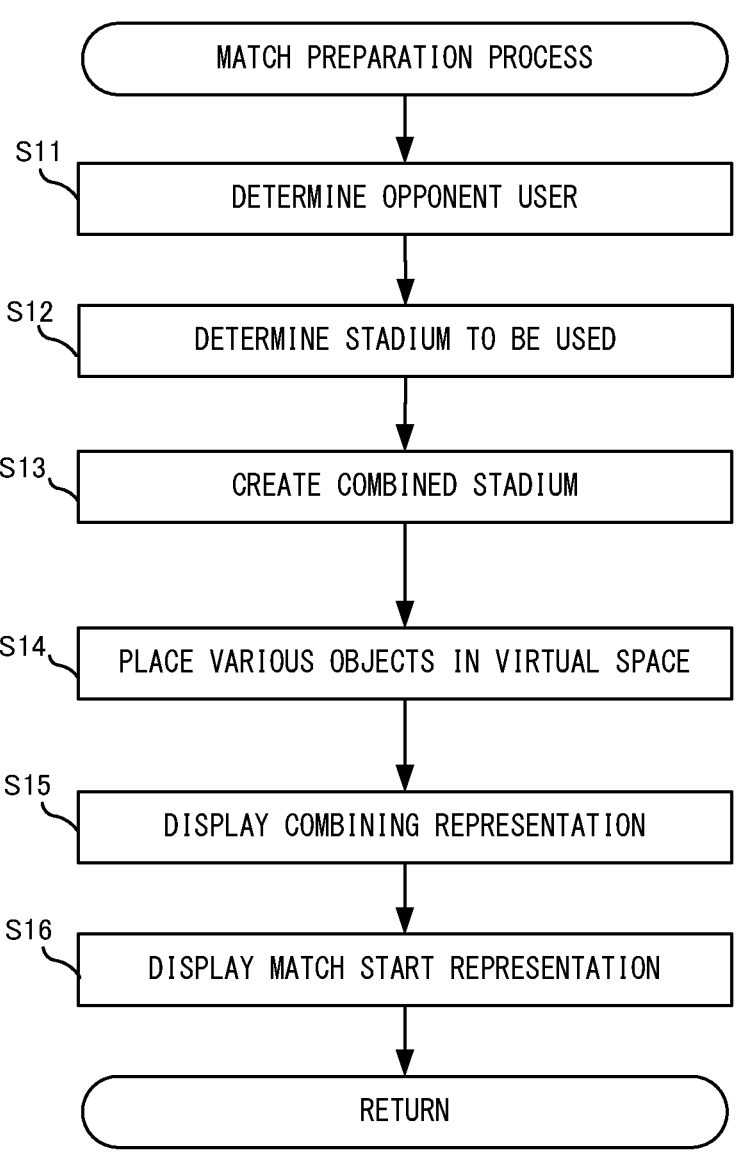

F I G.  1 2
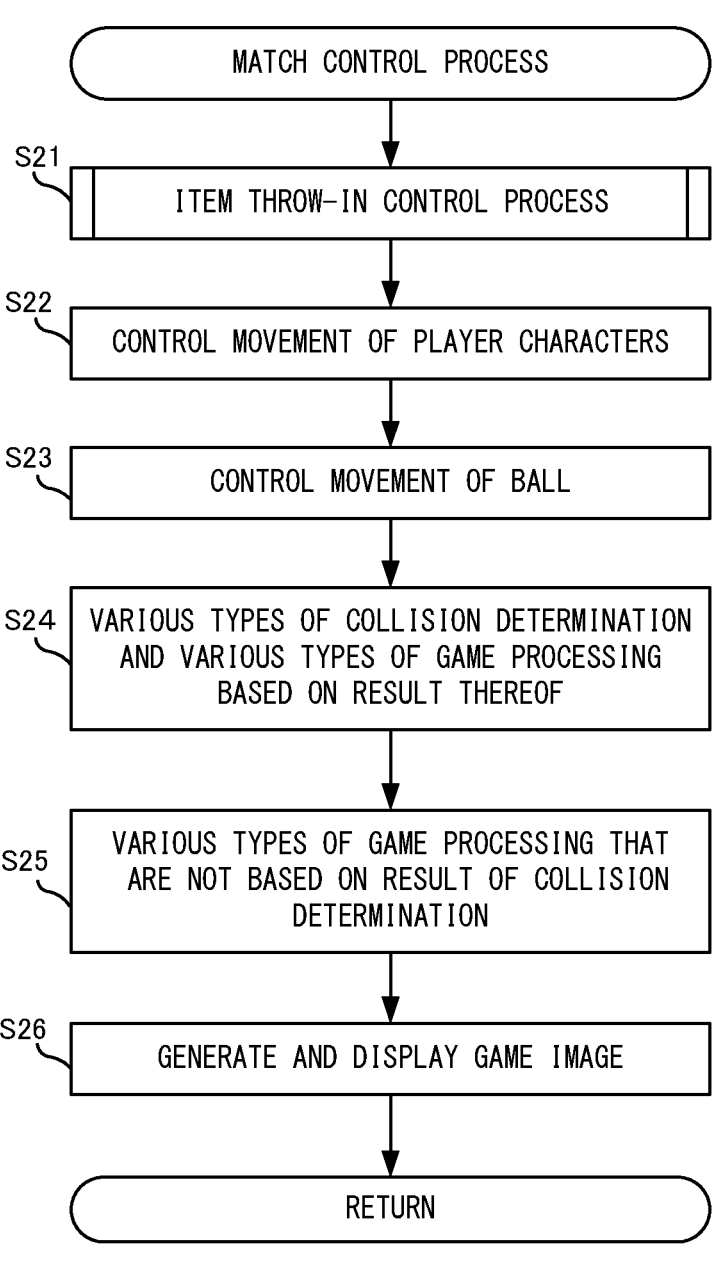

F I G. 1 3
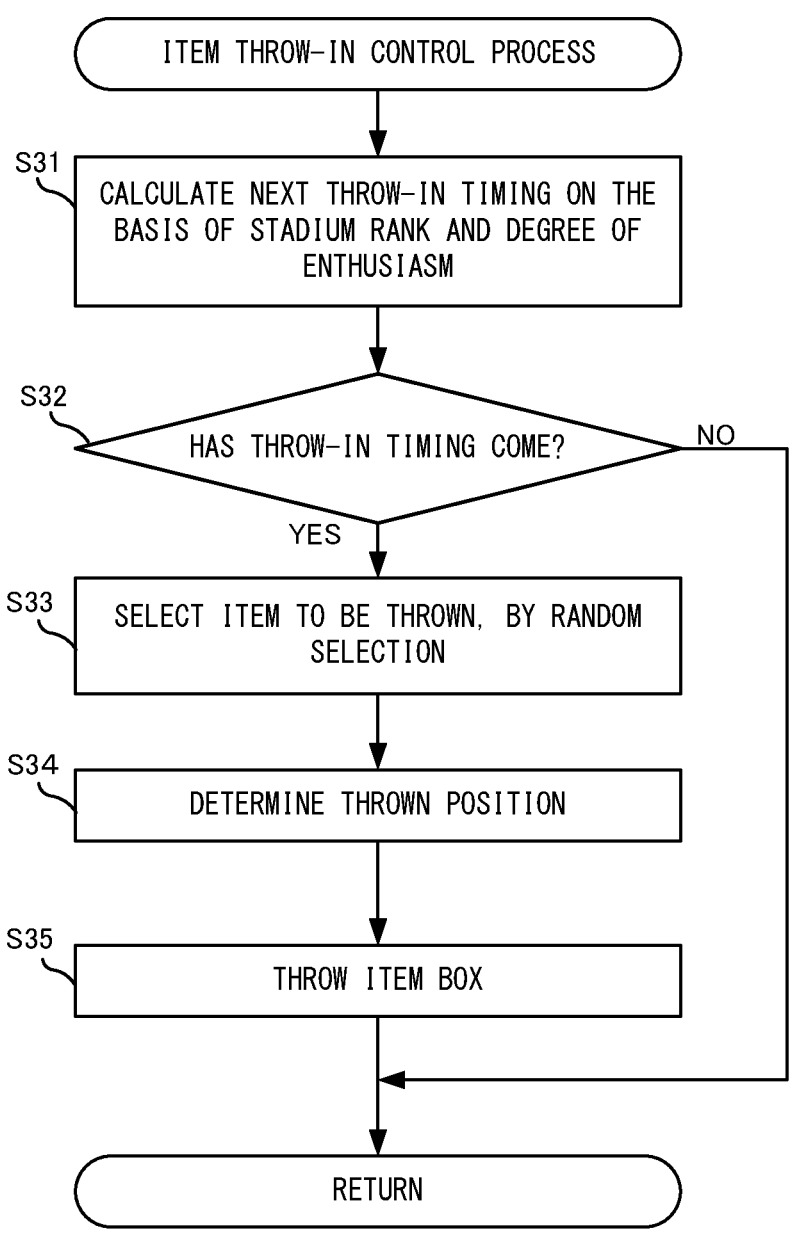

F I G. 1 4
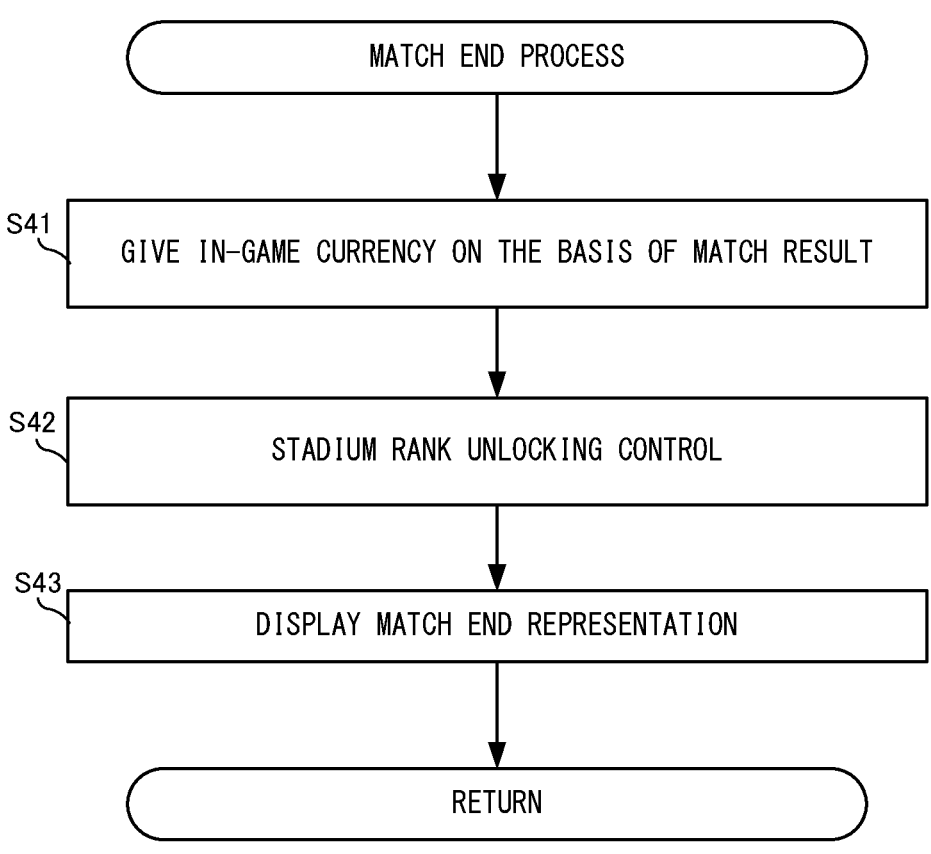

COMPUTER-READABLE NON-TRANSITORY STORAGE MEDIUM HAVING GAME PROGRAM STORED THEREIN, GAME SYSTEM, GAME APPARATUS, AND GAME PROCESSING METHOD

CROSS REFERENCE TO RELATED APPLICATION

This application claims priority to Japanese Patent Application No. 2022-12127 filed on Jan. 28, 2022, the entire contents of which are incorporated herein by reference.

FIELD

The present disclosure relates to information processing for executing a sports game in which clubs to which a plurality of users can belong can compete against each other.

BACKGROUND AND SUMMARY

Hitherto, sports games in which teams of users compete against each other have been known.

In the above game, a rank associated with the team of each user is determined according to the win-loss result of the competition. Then, for example, when matching opponents, teams having the same rank are determined to compete against each other.

However, in the above game, a rise in the rank of the team itself does not affect gameplay.

Therefore, an object of the present disclosure is to provide a computer-readable non-transitory storage medium having a game program stored therein, a game system, a game apparatus, and a game processing method which, in a sports game in which clubs of users can compete against each other, allow an advantageous effect to be caused during the game by raising the rank of a club.

In order to attain the object described above, for example, the following configuration examples are exemplified.

A configuration example is directed to a computer-readable non-transitory storage medium having stored therein instructions that cause a processor of an information processing apparatus, which executes a competitive sports game in which a team of a first club that at least one user joins and a team of a second club are caused to compete against each other and in which at least the first club is associated with a rank that is information regarding a degree of growth of the club, to execute the competitive sports game such that an advantageous effect corresponding to a level of the rank is given to the team of the first club during play of the competitive sports game.

According to the above configuration example, in the sports game in which clubs compete against each other, an advantageous effect corresponding to the rank of the club can be caused during the match. Therefore, it is also possible for the club having a higher rank to advantageously advance the match. Accordingly, in the competitive sports game, it is possible to introduce a growth element of raising the rank of the club, so that it is possible to improve the entertainment characteristics of the game.

In another configuration example, the information regarding the degree of growth of the club may be information regarding a scale of a stadium in which the team of the first club and the team of the second club compete against each other.

According to the above configuration example, the degree of growth can be reflected as the scale of the stadium.

Accordingly, it is possible to present the degree of growth in a form that is easy for the user to understand, such as the appearance of the stadium and the number of spectator seats.

In still another configuration example, a stadium part corresponding to the rank may be enabled to be associated with the stadium, and the instructions may cause the processor to cause the team of the first club and the team of the second club to compete against each other in a stadium object corresponding to the stadium associated with the predetermined stadium part.

According to the above configuration example, a competition can be performed using the stadium including the stadium part corresponding to the rank, that is, the stadium grown by the user. Accordingly, it is possible to provide a fun way for the user to perform a competitive play in a stadium created by the user.

In still another configuration example, the stadium part may include at least one spectator object placed on a spectator seat, and the instructions may cause the processor to place the spectator objects whose number corresponds to a level of the rank, in the stadium object and execute the game processing.

According to the above configuration example, by raising the rank, the number of spectators can be increased. By placing the spectators on the stadium objects, it is possible to present, to the user, the degree of growth of the club in the form of an increase in the number of spectators, which is easy for the user to visually understand.

In still another configuration example, the stadium part may include a spectator seat object on which at least one spectator is placed, and the instructions may cause the processor to place the spectator seat object whose scale corresponds to a level of the rank, in the stadium object and execute the game processing.

According to the above configuration example, by raising the rank, the scale of the spectator seats on which the spectators are placed (the number of spectator seats, or the like) can be increased. By placing the spectator seats in the stadium object, it is possible to present, to the user, the degree of growth of the club in a form that is easy for the user to visually understand.

In still another configuration example, the instructions may further cause the processor to: give the advantageous effect by causing an item to emerge during play of the competitive sports game; and cause the item to emerge at an emergence frequency corresponding to the level of the rank.

According to the above configuration example, the emergence frequency of the item which causes the advantageous effect corresponds to the level of the rank. That is, the higher the rank, the higher the emergence frequency of the item, which in turn increases the possibility of advantageously advancing the match. Accordingly, it is possible to provide motivation to the user to raise the rank, and improve the entertainment characteristics of the game.

In still another configuration example, the instructions may further cause the processor to cause the item to emerge at an emergence frequency based on an execution state of a predetermined play performed by a character of the team of the first club during play of the competitive sports game and the level of the rank.

According to the above configuration example, the emergence frequency during a match can be changed according to the execution status (number of times of execution, or the like) of the predetermined play (for example, shooting, or the like) during the match and the level of the rank. That is, the emergence frequency of the item can be changed according to the content of a play by the user themselves. In addition, for example, it is possible to create a situation in which the emergence frequency of the item is higher in the final stage of the match than in the initial stage of the match. Accordingly, it is also possible to gradually increase the excitement of the game, so that it is possible to reduce the possibility that the user becomes bored with playing in the middle of the match.

In still another configuration example, the item may be an item that improves performance of a character of the team of the first club or obstructs movement of a character of the team of the second club.

According to the above configuration example, by using the item, the match can be advantageously advanced. Therefore, it is possible to provide motivation to raise the rank of the club in order to increase the emergence frequency of such an item.

In still another configuration example, the item may be an item that is usable by both teams of the first team and the second team, and the instructions may cause the processor to cause the item to emerge at a position closer to a character of the team of the first club than to a character of the team of the second club in the stadium object during play of the competitive sports game.

According to the above configuration example, it is possible to create a situation in which the advantageous effect is easily caused for the character of the first team. In addition, when the rank is raised, it is easier to create such a situation, so that it is possible to provide motivation to raise the rank.

In still another configuration example, the instructions may cause the processor to control a character of the team of the first club at least on the basis of an ability parameter corresponding to the level of the rank during play of the competitive sports game.

According to the above configuration example, by raising the rank, the ability of the character used in the match can be increased. Accordingly, it is possible to provide motivation to raise the rank of the club.

In still another configuration example, the instructions may cause the processor to control a character of the team of the first club at least on the basis of an ability parameter corresponding to a win-loss record of the club during play of the competitive sports game.

According to the above configuration example, the ability parameter of the character used in the match can be set according to the win-loss record. Accordingly, it is possible to provide motivation to the user to aim for a better win-loss record, and it is possible for the user to have a sense of excitement of trying not to lose in the match, so that it is possible to improve the entertainment characteristics of the competitive sports game.

In still another configuration example, the instructions may cause the processor to execute, as the competitive sports game, a competitive sports game in which each of a character of the team of the first club and a character of the team of the second club places a predetermined object into a goal placed in a site for an opponent team.

According to the above configuration example, in the competitive sports game in which a ball is placed into an opponent goal, it is possible to provide a fun way to raise the rank of the club.

According to the present disclosure, in the competitive sports game, it is possible to introduce a growth element of raising the rank of the club, so that it is possible to improve the entertainment characteristics of the game.

BRIEF DESCRIPTION OF THE DRAWINGS

FIG. 1 is a block diagram showing a non-limiting example of the internal configuration of a game apparatus 2;

FIG. 2 is a block diagram showing a non-limiting example of the internal configuration of a server;

FIG. 3 is a diagram for describing a non-limiting example of a stadium combining representation;

FIG. 4 is a diagram for describing the non-limiting example of the stadium combining representation;

FIG. 5 is a diagram for describing the non-limiting example of the stadium combining representation;

FIG. 6 illustrates a memory map showing a non-limiting example of various kinds of data stored in a storage section 73 of the server;

FIG. 7 illustrates a non-limiting example of the data structure of a user database 204;

FIG. 8 illustrates a non-limiting example of the data structure of a virtual club database 205;

FIG. 9 illustrates a memory map showing a non-limiting example of various kinds of data stored in a storage section 22.

FIG. 10 is a non-limiting example flowchart showing the details of game processing according to an exemplary embodiment;

FIG. 11 is a non-limiting example flowchart showing the details of a match preparation process;

FIG. 12 is a non-limiting example flowchart showing the details of a match control process;

FIG. 13 is a non-limiting example flowchart showing the details of an item throw-in control process; and FIG. 14 is a non-limiting example flowchart showing the details of a match end process.

DETAILED DESCRIPTION OF NON-LIMITING EXAMPLE EMBODIMENTS

Hereinafter, an exemplary embodiment will be described. [Hardware Configuration of Information Processing Apparatus]

First, an information processing apparatus for executing information processing according to the exemplary embodiment will be described. The information processing apparatus is, for example, a smartphone, a stationary or hand-held game apparatus, a tablet terminal, a mobile phone, a personal computer, a wearable terminal, or the like. In addition, the information processing according to the exemplary embodiment can also be applied to a game system that includes the above game apparatus or the like and a predetermined server. In the exemplary embodiment, a stationary game apparatus (hereinafter, referred to simply as a game apparatus) will be described as an example of the information processing apparatus.

FIG. 1 is a block diagram showing an example of the internal configuration of a game apparatus 2 according to the exemplary embodiment. The game apparatus 2 includes a processor 21. The processor 21 is an information processing section for executing various types of information processing to be executed by the game apparatus 2. For example, the processor 21 may be composed only of a CPU (Central Processing Unit), or may be composed of a SoC (System-on-a-chip) having a plurality of functions such as a CPU function and a GPU (Graphics Processing Unit) function. The processor 21 performs the various types of information processing by executing an information processing program (e.g., a game program) stored in a storage section 22. The storage section 22 may be, for example, an internal storage medium such as a flash memory and a dynamic random access memory (DRAM), or may be configured to utilize an external storage medium mounted to a slot that is not shown, or the like.

The game apparatus 2 also includes a wireless communication section 23 for the game apparatus 2 to perform wireless communication with another game apparatus 2 or a predetermined server device. As this wireless communication, for example, internet communication or short-range wireless communication is used.

The game apparatus 2 also includes a controller communication section 86 for the game apparatus 2 to perform wired or wireless communication with a controller 4.

Moreover, a display unit 5 (for example, a television, or the like) is connected to the game apparatus 2 via an image/sound output section 25. The processor 21 outputs an image and sound generated (for example, by executing the above information processing) to the display unit 5 via the image/sound output section 25.

Next, the controller 4 will be described. The controller 4 of the exemplary embodiment is a controller that is connectable to the game apparatus 2 via a wire or wireless communication.

The controller 4 includes at least one analog stick 42 which is an example of a direction input device. The analog stick 42 can be used as a direction input section with which a direction can be inputted. By tilting the analog stick 42, a user is allowed to input a direction corresponding to the tilt direction (also input a magnitude corresponding to the tilt angle). In addition, the controller 4 includes a button section 43 including various operation buttons.

Moreover, the controller 4 includes an inertial sensor 44. Specifically, the controller 4 includes an acceleration sensor and an angular velocity sensor as the inertial sensor 44. In the exemplary embodiment, the acceleration sensor detects the magnitudes of accelerations along predetermined three axial directions. In addition, the angular velocity sensor detects angular velocities about predetermined three axes.

The controller 4 also includes a communication section 41 for performing wired or wireless communication with the controller communication section 24. The content of a direction input to the analog stick 42, information indicating a pressed state of the button section 43, and various detection results by the inertial sensor 44 are repeatedly outputted to the communication section 41 and transmitted to the game apparatus 2 at appropriate timings.

[Configuration of Server]

Next, the configuration of the above predetermined server which is able to communicate with the game apparatus 2 will be described. FIG. 2 is a functional block diagram of the server. The server includes at least a processor 72, a storage section 73, and a communication section 74. The processor 72 executes various programs for controlling the server. The various programs to be executed by the processor 72 and various kinds of data to be used by the processor 72 are stored in the storage section 73. The communication section 74 connects to a network via a wire or wireless communication and transmits/receives predetermined data to/from the game apparatus 2 or another server (not shown).

Here, in the exemplary embodiment, when the user starts a game described below, the game apparatus 2 used by the user is connected to the predetermined server, and a login process is performed. If the login is successful, various kinds of data required for game processing are transmitted from the server to the game apparatus 2. The game apparatus 2 stores the received data, and executes game processing described below, on the basis of the data.

[Game Assumed in Exemplary Embodiment]

Next, an outline of the game processing (an example of information processing) performed by the game apparatus 2 according to the exemplary embodiment will be described.

First, a game assumed in the exemplary embodiment is a sports game whose concept is a ball game. In the exemplary embodiment, a description will be given assuming, as an example of the ball game, a sports game for a ball game in which a goal frame (or its equivalent) is present on each of an own site and an opponent site and a goal can be scored by placing a ball (or an object equivalent to a ball) into the goal frame. For example, the game assumed in the exemplary embodiment is a sports game whose concept is a ball game such as soccer, basketball, and hockey. In addition, the game assumed in the exemplary embodiment may be a sports game whose concept is individual or team competitions in a martial art (kendo, judo, boxing, etc.). In the following, a description will be given assuming a sports game whose concept is soccer, as an example.

In the game, a plurality of player character objects (hereinafter, referred to simply as player characters) which are virtual humanoid objects are divided into a first team and a second team (own team and opponent team). The player characters of each team are placed in a player placement region (hereinafter, referred to as a field) included in a stadium object (described later) which is prepared in a virtual space. The field is a region in which a match is played by the player characters. In the exemplary embodiment, for easy understanding of the description, a description will be given with the motif of a soccer field as an example of a specific image of this field.

In the exemplary embodiment, each team consists of five player characters. One of the five player characters is a goalkeeper (hereinafter, referred to as GK), and the remaining four are field players. Here, in the game, the four field players can be operated by the user, and the GK is automatically controlled by AI throughout a match.

In the game, a match is played in a "stadium" including at least the above-described field. Before start of a match, the user is allowed to select a stadium to be used for the match. As for the types of selectable stadiums, in the game, in addition to "default stadiums" which are originally prepared in the game, it is also possible to select a home stadium (described in detail later) which is a stadium that can be customized by the user.

In this game, multiplay is also enabled. In the exemplary embodiment, it is assumed that a plurality of game apparatuses 2 are connected to each other via the internet and the predetermined server, and multiplay is enabled via a network. In another exemplary embodiment, multiplay may be enabled in a manner in which a plurality of game apparatuses 2 are directly connected to each other in a peer-to-peer system without the internet.

Here, in the exemplary embodiment, the case where the number of participants in multiplay is two will be described as an example. That is, the case where two users play against each other with one user in charge of one team will be described. Each user advances the game while switching an operation target among the four field players of the team of which the user is in charge, during a match (only one field player can be operated at a time, and the field players that are not being operated is controlled by AI).

In another exemplary embodiment, up to eight users may be allowed to participate in the game in a manner in which one user is in charge of operating one of the field players. In this case, one game apparatus is assigned to one user, and up to eight game apparatuses 2 are connected to each other via the network.

In the game, in addition to a competitive play between users, a competitive play of "user vs. CPU" or "CPU vs. CPU" is enabled (in the latter case, the user watches a competition between CPUs).

[Virtual Clubs]

Meanwhile, for example, in real soccer, there are organizations such as "soccer clubs". The game is designed to virtually reproduce such organizations in the game such that users can enjoy the community among themselves. Specifically, a user can create a virtual club (hereinafter, referred to simply as a "virtual club"). Alternatively, a user can join (belong to) a virtual club created by another user. In the following description, a user who has created a virtual club is referred to as an "owner". The role and authority as the owner can be transferred to another user.

In the above-described competitive play, the player characters of each team are players belonging to the same club. That is, the above match can also be a match of virtual club vs. virtual club.

[Home Stadium]

In real baseball or soccer, for example, baseball teams or soccer clubs often have "home" ballparks or stadiums. In order to reproduce this element, in the game, one home stadium object (hereinafter, referred to simply as a home stadium) is assigned to each virtual club described above. Furthermore, the appearance, etc., of the home stadium can be customized Examples of the elements that can be customized include the designs of various objects such as fences and goal frames that can be placed in the above field, and spectator seat objects which will be described later. Hereafter, the elements that can be customized are referred to as "stadium parts". In addition, in the game, the appearance of an area (for example, a predetermined circular area) surrounding the home stadium such as terrain can also be customized. The overall appearance of the home stadium and terrain objects placed around the home stadium can be customized as stadium parts based on a "theme". For example, in the case of a "forest" theme, the overall appearance of the stadium is designed with green as the base color, and becomes a stadium in which there is a field in a hollowed-out stump of a large tree. The terrain around the home stadium also becomes terrain in which there are many trees. For example, in the case of a "city" theme, the overall appearance of the stadium becomes the appearance of a concrete stadium, and the terrain around the stadium becomes terrain having an urban appearance with buildings and roads. For example, in the case of a "beach" theme, the overall appearance of the stadium becomes the appearance of an open stadium in which there are no exterior walls and spectator seats are on a sandy beach, and the terrain around the stadium becomes terrain having an appearance in which the stadium is surrounded by the sea. In the following description, the term "stadium (home stadium, and the above default stadiums)" is treated so as to include the terrain around the stadium. However, in another exemplary embodiment, only a stadium portion which is a structure may be treated as a stadium without including the terrain around the stadium.

As for the field of each stadium, the size of the field itself is the same for all stadiums. In the exemplary embodiment, the size of the base of the entire stadium is also the same for all stadiums. However, in another exemplary embodiment, although the size of each field is the same, the size of the base of each entire stadium does not necessarily have to be the same. For example, in the case where a stadium is assumed to have a circular area including the terrain around the stadium when viewed from above, the radius of this circular area itself may be different depending on the stadium. In the exemplary embodiment, even if a stadium has any shape, the center position of the stadium is the same as the center position of the field thereof.

Here, an operation (method) for customizing the home stadium will be described. In the game, the owner can "purchase" a stadium part by consuming a predetermined amount of in-game currency. A method for obtaining the in-game currency is to play matches, and a predetermined amount corresponding to a match result (win or loss) is obtained. For example, the owner can "purchase" a fence or goal frame of a different design by consuming the in-game currency. In a predetermined customization screen, the owner can select a stadium part that has already been purchased, and perform an operation for applying the selected stadium part to the home stadium. Accordingly, for example, the owner can change the stadium part of the home stadium.

In the game, the authority to customize the home stadium is assumed to be given only to the owner. However, in another exemplary embodiment, a user other than the owner may also have the authority to customize the home stadium as a result of a process such as transferring the authority.

[Spectator Element of Home Stadium]

In the game, the home stadium also has a "spectator" element. Specifically, the home stadium includes a "spectator placement region". When a match is to be played, a predetermined number of spectator objects (hereinafter, referred to simply as spectators) are placed in the spectator placement region. During the match, the spectators throw objects called "item boxes", into the field at a predetermined time interval. The predetermined time interval will be described in detail later, and the larger the number of spectators, the shorter the time interval at which the item box is thrown, so that the number of thrown items in one match can be increased. In the game, spectators to be placed in a certain home stadium support a virtual club corresponding to the home stadium (hereinafter, referred to as a supporting club). In other words, all spectators to be placed in a certain home stadium are set as supporters of a virtual club having the home stadium.

In the exemplary embodiment, the item boxes are objects having a box-like appearance, and the specific item contents thereof are not recognized at a glance. When the field player comes into contact with the item box, an item selected by random selection emerges on this spot, and the field player can automatically acquire the item that has emerged. This predetermined item gives a certain effect that is advantageous in the progress of the game. In the exemplary embodiment, in order to cause the effect of the item, a predetermined item use operation is required. The user can cause the effect of the item by performing the item use operation at a predetermined timing after the item is acquired. In this regard, in another exemplary embodiment, an item whose effect is caused when the item is acquired may be caused to emerge.

Here, some examples of the effect of the above item will be described. First, as the item, there is an item having an effect (performance enhancing function) of enhancing the performance of the player character. For example, such an item is an item having an effect of temporarily increasing the movement speed of the player character that has acquired the item. In addition, there is also an item having an effect (obstructing function) of obstructing the movement and action of the player character. For example, such an item is an item that can blow away an opponent that is hit by the item when the item is thrown, or is a bomb-like item that temporarily stops the movement of player characters in a predetermined range when exploded.

In the game, the above items are classified into two types of items, that is, shared items and exclusive items. The shared items are items that can be acquired and used by the player characters of both of two teams playing against each other. The exclusive items are items each of which can be acquired and used by only a player character of a virtual club of a home stadium to which a spectator having thrown the item belongs. That is, for the spectators, the exclusive items are items that can be used by only the player characters of the supporting club. In the game, various items having the above-described effects are stored separately as shared items and exclusive items, and one of these items is selected by random selection as an item that is to be thrown as an item box.

Furthermore, in the game, the following control is also performed for a position to which a spectator throws an item box. That is, the position of a player character of the supporting club or a position near the player character is set as a position (target point) to which an item box is to be thrown. That is, control is also performed such that an item box is thrown to a position at which the item box is more easily acquired by a field player of the supporting club than by a field player of an opponent team. As for the above shared items, the shared items can be acquired by both the own team and the opponent team, but by adjusting the thrown position as described above, it is made easier to cause an effect that is advantageous for the virtual club related to the home stadium.

In the exemplary embodiment, as for acquisition of the item, the case of acquiring the item simultaneously with contact with the item box will be described as an example. In this case, it can be said that there is no possibility that the item is taken by another player character. In this regard, in another exemplary embodiment, contact with the item box and contact with the item that has emerged may be separately determined. In this case, for example, a player character A causes an item to emerge, and a player character B can acquire the item that has emerged. In addition, in still another exemplary embodiment, the above item box may not necessarily be used, and an item may be directly thrown in.

As for the item that emerges from the item box, for example, an item box to be thrown is selected by random selection, but in the exemplary embodiment, the rate of selection is adjusted such that an item having a higher effect for a team that is at a disadvantage at that time is more likely to be selected.

[Growth Element of Home Stadium]

Next, a growth element of the home stadium will be described. In the game, a growth element of "stadium rank" is added to the above home stadium. In the game, the stadium rank includes four levels (rank 1 to rank 4), and starts with stadium rank 1. When the stadium rank is raised, the scale of the home stadium is increased. Since the home stadium is assigned to the virtual club so as to be associated therewith as described above, the stadium rank also has an aspect of information indicating the degree of growth of the virtual club.

A method for raising the stadium rank will be described. First, immediately after a virtual club is created, the stadium rank is 1, and ranks 2 to 4 are "locked". By satisfying a predetermined condition, a rank (higher rank) higher by one than the current rank can be "unlocked". As the condition for unlocking, in the exemplary embodiment, satisfying either one of the following two conditions is required. The first condition is that the number of wins for matches reaches a predetermined number. In the game, if the number of wins reaches the predetermined number, a promotion to a higher league is achieved, and a process of unlocking a higher rank is performed along with the promotion (even if a demotion to a lower league occurs, the unlocked state remains unchanged). The second condition is that the total number of matches reaches a number that is predetermined for each rank, regardless of wins and losses. In the exemplary embodiment, if either one of these two conditions is satisfied, a higher rank is "unlocked". These conditions are examples, and the stadium rank may be raised by using another condition or another method.

If a higher rank is unlocked by satisfying the above condition, the stadium parts corresponding to the unlocked rank become available for purchase. In the game, as for the above-described stadium parts, the stadium parts that can be purchased are divided by rank. For example, even for the same "fence" parts, there is a "fence A" that can be purchased at stadium rank 1, and there is a "fence B" that cannot be purchased before stadium rank 2 is reached. Also, for example, there are stadium parts that cannot be purchased at stadium ranks 1 and 2 but can be purchased when stadium rank 3 is reached. In addition, various other stadium parts corresponding to each stadium rank are prepared.

Here, one of the above stadium parts that can be purchased is a "spectator seat object" (hereinafter, referred to simply as a spectator seat). The spectator seat is an object that can be placed in the above spectator placement region, and the spectator is placed on the spectator seat. For example, the spectator is placed in a manner in which the spectator sits on the placed spectator seat (in other words, the spectator itself can be considered as a kind of stadium part). As for the spectator seat, spectator seats corresponding to each stadium rank are prepared. In the game, the number and scale of spectator seats corresponding to a higher stadium rank are larger than those of spectator seats corresponding to a lower stadium rank.

An example of a change in scale corresponding to a stadium rank will be described. For example, at stadium rank 1, the home stadium looks like a "practice field" as a whole, with its field being like a ground without fences. Also, the spectator seats that can be purchased and placed at this stage are objects that look like grass (that is, grass-type spectator seats that look as if spectators sit directly on the ground, not chair-shaped spectator seats). In addition, the number of seats is, for example, 100. Next, when the stadium rank is raised to 2, the appearance of the home stadium can be changed to that of a small-sized stadium where fences, etc., can be installed in the field. In addition, the spectator seats that can be purchased and placed are chair-type or bench-type spectator seats. These spectator seats are spectator seats only at the first floor, and the number of seats is, for example, 300. Next, at stadium rank 3, the appearance of the home stadium can be changed to that of a medium-sized stadium where, for example, lighting, etc., can be installed. The spectator seats that can be purchased and placed are spectator seats at up to the second floor, and the number of seats is, for example, 600. Furthermore, at stadium rank 4, the appearance of the home stadium can be changed to that of a large-sized stadium where a large screen, etc., can also be placed. The spectator seats that can be purchased and placed are roofed spectator seats at up to the third floor, and the number of seats is, for example, 1000. As described above, as the stadium rank is raised, the scale of the spectator seats is increased, so that the maximum number of spectators to be placed thereon is increased. For example, the maximum number of spectators that can be placed is increased such that the maximum number of spectators is 100 at rank 1, 300 at rank 2, 600 rank 3, and 1000 at rank 4 (as described above, the more the spectators, the more the chances of throwing the item box).

When purchasing spectator seats, in the exemplary embodiment, spectator seats whose number is a maximum number of seats corresponding to the stadium rank (for example, 100 seats in the case of rank 1) can be purchased in a single purchase, and 100 seats can be placed together through one placement operation. In another exemplary embodiment, one spectator seat (or any optional number of spectator seats) may be able to be purchased and placed at one time.

In the exemplary embodiment, as for the spectator objects themselves, a plurality of types are prepared. The number of types of spectators to be placed is increased according to the stadium rank. For example, it is assumed that there are four types of spectator objects, that is, spectators A to D having different appearances. At stadium rank 1, only spectators A are placed, but at stadium rank 2, spectators A and B are placed. Furthermore, at stadium rank 3, three types of spectators, that is, spectators A, spectators B, and spectators C, are placed, and at stadium rank 4, four types of spectators, that is, spectators A to D, are placed.

Here, in the exemplary embodiment, the number of spectators to be placed at the time of a match is a number that always makes all the seats filled (number of spectator seats=number of spectators). As described above, the scale of the spectator seats is linked to the stadium rank. Therefore, by raising the stadium rank, the number of spectators can be increased, so that the chances of obtaining an advantageous effect corresponding to the stadium rank (by the above thrown item) can be increased. In addition, in the exemplary embodiment, since the example in which the stadium rank includes four levels is described, the number of spectators is also increased stepwise from level 1 to level 4 according to the stadium rank.

In another exemplary embodiment, the number of spectators and the number spectator seats at the time of a match may be different from each other (that is, there may be empty seats). For example, in the case of stadium rank 1, the number of spectators may be set to a predetermined number within the range of 1 to 100, and in the case of stadium rank 2, the number of spectators may be set to a predetermined number within the range of 1 to 300 or within the range of 101 to 300. In this case, the number of spectators may be randomly set, or, for example, a parameter called "popularity" (which increases or decreases according to a win or loss for a match, for example) may be provided for each virtual club, and the number of spectators may be set on the basis of the popularity.

In the exemplary embodiment, the spectators and the spectator seats are treated as different objects, but in another exemplary embodiment, only the spectators may be placed in the spectator placement region without using the spectator seat objects. In this case, as for the number of spectators, spectators whose number corresponds to the level of the stadium rank may be placed.

In still another exemplary embodiment, an object that is a set of "one spectator seat" and "(at least one) spectator" may be treated as a "spectator seat" (or "spectator").

Next, the time interval (frequency) at which the spectator throws the item box will be described. In the exemplary embodiment, during a match, the spectators throw the item boxes at a predetermined time interval. The time interval is different depending on the stadium rank. For example, in the case of stadium rank 1, the items are thrown at an interval of 120 seconds (from the start of the match). At stadium rank 2, the items are thrown, for example, at an interval of 90 seconds; at stadium rank 3, the items are thrown, for example, at an interval of 60 seconds; and at stadium rank 4, the items are thrown, for example, at an interval of 30 seconds. In addition, the throw-in timing may be determined to be a timing selected randomly from a predetermined period. For example, instead of the above interval of 120 seconds, a timing selected randomly from a period of 110 seconds to 130 seconds may be the above throw-in timing. The next throw-in timing may be a timing selected randomly from a period of 110 seconds to 130 seconds after the current timing. As described above, by shortening the interval for throwing the item box according to the stadium rank, an advantageous effect can be more easily caused as the stadium rank is raised, so that it is possible to provide motivation to the user to raise the stadium rank.

Furthermore, in the game, a parameter indicating the degree of enthusiasm of spectators for a match (hereinafter, referred to simply as degree of enthusiasm) is used. Control in which the interval for throwing the item box is further shortened according to an increase in the degree of enthusiasm is also performed. An example will be described below. First, the above throw-in interval corresponding to the stadium rank is referred to as an initial throw-in interval. In addition, as for the degree of enthusiasm, an initial value thereof at the start of a match is "0". During the match, each time a predetermined condition for increasing the degree of enthusiasm (hereinafter, referred to as "degree-of-enthusiasm increase condition) is satisfied, the degree of enthusiasm is increased. The degree-of-enthusiasm increase condition is that a preset play is performed as a play that excites the spectators, for example, a player character shoots a goal. In addition, a value by which the degree of enthusiasm is increased when such a degree-of-enthusiasm increase condition is satisfied is also different depending on the stadium rank. In the game, the higher the stadium rank, the higher the value by which the degree of enthusiasm is increased. For example, when a player character shoots a goal, the value by which the degree of enthusiasm is increased may be "1" at stadium rank 1, "2" at stadium rank 2, "4" at stadium rank 3, and "8" at stadium rank 4. Each time the degree of enthusiasm exceeds a predetermined threshold, the interval for throwing the item is shortened. For example, control, in which the item throw-in interval is shortened from the initial throw-in interval by 10 seconds if the degree of enthusiasm exceeds 20, and then the item throw-in interval is shortened further by 10 seconds if the degree of enthusiasm exceeds 50, is performed.

Furthermore, as for the value by which the degree of enthusiasm is increased, in addition to the difference based on the stadium rank, an increase value that is different for each play that is defined as satisfying the degree-of-enthusiasm increase condition may be set.

In the exemplary embodiment, a condition that a predetermined play is made is exemplified as the degree-of-enthusiasm increase condition. In addition to this, the degree of enthusiasm may be increased when a predetermined condition for a match is satisfied, for example, when a hat trick is scored.

[Stadium Combining]

As described above, by raising the stadium rank of the home stadium, it is made easier to obtain an advantageous effect during a match, but this is the case where the user plays the match at the home stadium of the virtual club to which the user belongs. In this regard, in a conventional game, when a match is to be started, only one stadium to be used is selected from among a plurality of candidates (equivalent to the default stadiums). For example, when a user A and a user B want to perform a competitive play with each other, even if a plurality of stadiums are displayed as choices in a list, the stadium to be used for the competitive play is one stadium selected from among these stadiums. Therefore, even if the user A and the user B belong to different virtual clubs, each club has a grown home stadium, and the home stadiums of both clubs are displayed in the above stadium list, only one of the stadiums can be selected. In this case, the user who belongs to the club of the home stadium that has not been selected cannot sufficiently receive the benefits of the above-described advantageous effect related to the home stadium.

In addition, by allowing users to customize their home stadiums as described above, it is expected that, the users will want to show their customized home stadiums to each other. However, if only one stadium can be selected at the time of a match as described above, there may be a possibility that such needs cannot be sufficiently met.

Therefore, in the exemplary embodiment, when a match is to be played, a plurality of stadiums including the home stadiums related to two users who play against each other and the above default stadiums are displayed in a list, and the users are caused to select two stadiums from among these stadiums. For example, one of the users selects a first stadium, and the other user who is the opponent selects a second stadium (here, both users select the home stadiums of the virtual clubs to which the users belong, respectively). Then, the selected two stadiums are combined to create one "combined stadium", and it is possible to play a match using this combined stadium. As for this combining, in the exemplary embodiment, each stadium is divided into two parts in advance. As for the position of the division, in the exemplary embodiment, each stadium is divided at a position at which at least the field is equally divided. In the exemplary embodiment, a soccer field is assumed as an example, and the field is divided along a so-called centerline thereof. That is, each stadium is divided into two parts such that one of the parts includes an own site portion of the field and the other part includes an opponent site portion of the field. In the following description, for convenience, the case where the field is viewed from above such that the field is laterally long is assumed, and the parts resulting from the above division are referred to as a "right half portion" and a "left half portion", respectively. In the exemplary embodiment, a combined stadium is created by combining one of the half portions of each of the selected two stadiums with each other. For example, the left half portion of a home stadium A of a virtual club A (an operation target of a first player) and the right half portion of a home stadium B of a virtual club B (an operation target of a second player) are combined into one combined stadium. In this case, these half portions are combined such that the centers of the fields of these home stadiums coincide with each other. As described above, the field size itself is the same for all stadiums. Thus, as for at least the field portions, even if any stadiums are combined, a field having the same size is formed. On the other hand, as for the other portions (stadium outer walls, spectator seats, etc.), those having different appearances are combined with each other.

In the exemplary embodiment, a common appearance is used as the appearance of the field. However, in another exemplary embodiment, similar to the other portions, the appearance of the field may be different. For example, the appearance of the field of a first stadium may be green grass, and the appearance of the field of a second stadium may be brown grass. In still another exemplary embodiment, the field portion of each home stadium may have an "attribute", and the attribute may be different for each home stadium. For example, a parameter related to the ease of movement may be set as an attribute, the field of a first stadium may be "grass", the field of a second stadium may be "sandy beach", and a movement speed or the like on the sandy beach may be lower than that on the grass.

As for the field of a combined stadium obtained by combining home stadiums, the field portion corresponding to the home stadium of each club is an own team site for the club.

As for selection of a stadium, here, the case where users play against each other is described as an example, but in the case of a match of "user vs. CPU" or "CPU vs. CPU", each CPU may select its own stadium, or the user may select a stadium for each CPU instead of each CPU.

Furthermore, in the game, as a representation before the start of a match, a state where such home stadiums are combined into one stadium is presented as a "stadium combining representation" to the user. In the exemplary embodiment, a state where halves of two stadiums are moved closer to each other from positions separated from each other and one combined stadium is created such that the cross-sectional portions of the two stadiums are attached to each other, is displayed as a stadium combining representation. FIG. 3 to FIG. 5 show an example of such a stadium combining representation. These drawings show the case where a virtual camera is located at a position at which a stadium is seen from above in the virtual space. For example, as shown in FIG. 3, opposing half portions of a first stadium and a second stadium initially emerge at positions separated from each other in a 3D virtual space. Here, for convenience, each of these half portions is referred to as a right half or left half. As for this right-left relationship, a positional relationship in the case where fields are seen so as to be laterally long is assumed. In addition, when these half portions emerge, these half portions emerge such that the cross-sectional portions of the two stadiums oppose each other. In the example of FIG. 3, the left half of the first stadium emerges on the left side of the drawing, and the right half of the second stadium emerges on the right side of the drawing, but the relationship therebetween may be reversed. That is, the left half of the second stadium and the right half of the first stadium may emerge. Then, as shown in FIG. 4, a state where these halves move closer to each other is displayed. Then, as shown in FIG. 5, a state where the cross-sectional portions are attached to each other to create one combined stadium is displayed. Then, a camera movement in which the virtual camera comes closer to the combined stadium and moves around each spot in the stadium may be performed. For example, a camera movement in which a close-up of the goal frame of each stadium is shown may be performed. In addition, although these drawings each show a view from above, the camera movement of the virtual camera during the stadium combining representation is optional, and it is needless to say that the virtual camera may take images at various positions or angles.

By presenting the above combining representation to the user, it is possible to provide a new fun way to show home stadiums customized by users to each other in a series of operations related to execution of a competitive play. That is, it is also considered that, by allowing a home stadium to be customized as described above, the need that the user wants to show a home stadium created by the user to other users, or the user wants to see a home stadium created by another user, arises. By displaying a home stadium combining representation before the start of a match as in the game, it is possible to respond to such a need in the flow of operations when performing a competitive play. Furthermore, each user can visually recognize the difference between the spectator seats or the numbers of spectators in the home stadiums thereof, so that it is also possible for each user to grasp the stadium rank of the opponent before the match. Accordingly, it is possible to make the user consider the presence/absence of a difference in stadium rank and the strategy or the like for the match before the match, so that it is possible to enhance the strategic characteristics of the game and further improve the entertainment characteristics of the game.

Here, supplementary description will be given regarding a boundary (cross-section) in a combined stadium. For example, home stadiums having stadium rank 1 and stadium rank 4 have differences in shape of the stadium itself and the number of floors of spectator seats, etc., which may cause a difference in height between the cross-sectional portions at the boundary of a combined stadium. For example, as for the spectator seats of a 3-floor stadium having stadium rank 4, a cross-sectional portion thereof may be seen at a boundary in a combined stadium. Therefore, in the game, as for each home stadium (appearance data thereof), the data structure thereof may be a structure in which data of a right half portion and data of a left half portion are individually provided, and an appropriate texture may be attached to a portion, which can be the above cross-section, such that the portion does not look unnatural.

Meanwhile, when the home stadiums of virtual clubs are combined with each other, there are spectators of the two clubs in a combined stadium. In the exemplary embodiment, the throw-in of the above item is controlled individually for each spectator corresponding to each home stadium. Therefore, for example, when home stadiums having stadium rank 1 and stadium rank 3 are combined with each other, at least immediately after the start of a match, the item throw-in frequency for the team corresponding to the virtual club having stadium rank 3 is higher, which is advantageous for this team. However, the difference in the item throw-in frequency may be eliminated depending on the development of the match and the degree of increase in the above degree of enthusiasm.

In the exemplary embodiment, the case where the home stadiums of virtual clubs are selected is described as an example. Even in the case where any one or both of these home stadiums are default stadiums, a combined stadium is similarly created using half portions of the default stadiums. However, in the case where a default stadium is used, the benefits of the above advantageous effect of the item thrown by the spectator are no longer received. In this regard, in another exemplary embodiment, even in the case where a default stadium is used, for example, the default stadium may be treated in the same manner as in the case of stadium rank 1 (that is, in the case of the lowest rank), spectators may be placed in the default stadium, and the above-described item throw-in control may be performed. In this case, the benefits based on stadium growth cannot be received, but the benefits of the advantageous effect by the thrown item itself can be received.

As described above, in the exemplary embodiment, a growth element is introduced into the home stadium (virtual club), and control is performed such that an advantageous effect is given during a match according to the degree of growth. In addition, it is also possible to play a match (perform a competitive play) in a combined stadium obtained by combining two stadiums. Accordingly, it is possible to provide a sports game that enables an unprecedented new way to enjoy sports.

[Details of Game Processing of Exemplary Embodiment]
Next, the game processing in the exemplary embodiment will be described in more detail with reference to FIG. 6 to FIG. 14. First, various kinds of data to be used in the game processing will be described. Here, data stored in the predetermined server will be described, and then data that can be stored in the game apparatus 2 will be described.

[Data Stored in Server]
FIG. 6 illustrates a memory map showing an example of programs and data stored in the storage section 73 of the predetermined server. The storage section 73 includes a program storage area 201 and a data storage area 203. In the program storage area 201, a server-side game processing program 202 is stored. In addition, in the data storage area 203, at least a user database 204, a virtual club database 205, and other game-related data 206 are stored.

The server-side game processing program 202 is a program for causing the server to execute various functions (login process, opponent matching process, etc.) that the server is responsible for, in the game processing according to the exemplary embodiment.

The user database 204 is a database that stores information about each user of the game according to the exemplary embodiment. FIG. 7 illustrates an example of the data structure of the user database 204. The user database 204 includes a plurality of user records 214. Each user record 214 includes account data 215, saved data 216, etc.

The account data 215 is information regarding an account of each user, and is also used as information for uniquely identifying each user. In addition, the account data 215 is also used for a login process.

The saved data 216 is information obtained by saving the play status, progress status, etc., of each user. The saved data 216 also includes information for identifying a virtual club to which the user belongs to, etc.

Referring back to FIG. 6, the virtual club database 205 is a database regarding the above virtual clubs. FIG. 8 illustrates an example of the data structure of the virtual club database 205. The virtual club database 205 includes a plurality of virtual club records 221. Each virtual club record 221 includes at least a virtual club ID 222, owner data 223, owned currency data 224, home stadium data 225, and member data 229.

The virtual club ID 222 is an ID for uniquely identifying each virtual club.

The owner data 223 is information for identifying the user who is the owner of the virtual club (in the default, the user who has created the virtual club is set).

The owned currency data 224 is data indicating the in-game currency owned by the virtual club (that is, stored as club funds). In the game, customization is made possible by purchasing stadium parts as described above. Therefore, the in-game currency that can be used for purchasing stadium parts is associated with each virtual club. In addition to this, each user may have in-game currency that can be used by the user.

The home stadium data 225 is data regarding the home stadium of the virtual club. The home stadium data 225 includes at least stadium rank data 226, right half structure data 227, and left half structure data 228. The stadium rank data 226 is data indicating the current stadium rank of the home stadium. The right half structure data 227 is data indicating the structure of the right half portion of the home stadium. Specifically, the right half structure data 227 includes at least information that identifies stadium parts used in the right half portion of the home stadium, and information that identifies the placement positions and orientations thereof. Similarly, the left half structure data 228 is data indicating the structure of the left half portion of the home stadium. In addition, in a predetermined customization screen or the like, the user can perform an operation for applying a purchased stadium part to the home stadium, whereby the structure content of the home stadium is changed, and the content of the home stadium data 225 is updated as appropriate.

In the exemplary embodiment, the structure of the home stadium data 225 will be described with an example in which the home stadium data 225 is separated into the right half structure data and the left half structure data as described above. However, in another exemplary embodiment, the structure of the home stadium data 225 does not have to be a data structure including right half structure data and left half structure data. For example, data corresponding to the right half portion and the left half portion of the stadium are selected as appropriate from the data of the entire stadium, and the data indicating the structure of the stadium right half and the structure of the stadium left half may be specified.

The member data 229 is information for indicating the user who belongs to the virtual club.

In addition, although not shown, each virtual club record 221 also includes the name, emblem, etc., of the virtual club.

Referring back to FIG. 6, the other game-related data 206 is various kinds of data to be used in the above-described game processing. At the timing of the above login process or at a predetermined timing during the game, data extracted from the other game-related data 206 is transmitted from the server to the game apparatus 2 as necessary.

Next, data to be used in the game apparatus 2 will be described. FIG. 9 illustrates a memory map showing an example of programs and data stored in the storage section 22 of the game apparatus 2. The storage section 22 includes a program storage area 301 and a data storage area 303. In the program storage area 301, a game processing program 302 is stored. In addition, in the data storage area 303, data, such as user data 304, belonging club data 305, default stadium data 306, item master data 307, a random selection table 308, match control data 309, virtual camera control data 314, operation data 315, transmission data 316, and received data 317, are stored.

The game processing program 302 is a program for executing the game processing according to the exemplary embodiment.

The user data 304 is data regarding the user who is using the game apparatus 2. The user data 304 is data that is predetermined information, corresponding to the user, which is selected from the user database 204 in the above login process, and that is data received and stored from the server. For example, the user data 304 includes a user name, etc.

The belonging club data 305 is data regarding the virtual club to which the user belongs. The belonging club data 305 is, for example, data that is the virtual club record 221 selected according to the user, who has logged in, from the virtual club database 205 in the login process and that is received and stored from the server.

The default stadium data 306 is data regarding the default stadiums prepared originally in the game. The default stadium data 306 includes data indicating the appearance configurations of the default stadiums, etc.

The item master data 307 is master data that defines various items as described above. The item master data 307 includes, for each item, the identifier, the appearance, the effect of the item, information indicating whether the information is a shared item or an exclusive item, etc.

The random selection table 308 is data to be used for selecting an item to be thrown as the item box, by random selection, and is data that defines the rate of selection of each item.

The default stadium data 306, the item master data 307, and the random selection table 308 may be included in the other game-related data 206 in the server. These data may be received and stored from the server at a predetermined timing such as a login process. Alternatively, these data may be stored as part of a game application in the game apparatus 2, and may be loaded into the storage section 22, for example, when the game application is started.

Next, the match control data 309 is data that is generated and used as necessary during the game processing in order to control processing related to a match as described above. In the match control data 309, at least player character data 310, match status control data 311, degree-of-enthusiasm control data 312, and combined stadium data 313 are stored.

The player character data 310 is data regarding the above player characters. The player character data 310 includes various kinds of data for controlling the movement of each player character during a match, such as the current position or posture, the current action state (for example, a state during shooting, during dribbling, or the like), etc., of each player character.

The match status control data 311 is data for managing the entirety of a match. The match status control data 311 includes, for example, the following data. First, the match status control data 311 includes data for identifying the users (and another game apparatus 2) participating in the match. The match status control data 311 also includes data indicating the team of which each user is in charge, and data indicating the player character that is the current operation target of each user during the match. In addition, the match status control data 311 also includes various kinds of data for managing and controlling the progress, etc., of the match, such as data indicating the current scores and data indicating the elapsed time from the start of the match.

The degree-of-enthusiasm control data 312 is data for managing the above-described degree of enthusiasm. The degree-of-enthusiasm control data 312 includes data indicating the current degree of enthusiasm, for each of two teams (own team/opponent team) playing against each other.

The combined stadium data 313 is data regarding the combined stadium used in the match. For example, the information that identifies a combination of stadiums related to the combined stadium, object data of the combined stadium itself, or the like is stored.

The virtual camera control data 314 is data for controlling the movement of the virtual camera. Specifically, the virtual camera control data 314 is data that specifies the position, the orientation, the angle of view, the imaging direction, etc., of the virtual camera. During a match, basically, the content of the virtual camera control data 314 is automatically set such that the player character operated by the user appears substantially at the center of the screen. In addition, the virtual camera control data 314 may be set on the basis of an operation on the virtual camera by the user. Moreover, when a representation such as the above stadium combining representation is to be displayed, the virtual camera control data 314 is set on the basis of data that defines a camera movement for each representation.

The operation data 315 is data indicating the content of an operation performed on the controller 4. For example, the operation data 315 includes data indicating a pressed state of the button section 43 such as a cross key or an input state to the analog stick 42. The content of the operation data 315 is updated at a predetermined cycle on the basis of a signal from the controller 4 (communication section 41).

The transmission data 316 is data to be transmitted to another game apparatus 2, and includes at least information for identifying the transmission source and the content of the operation data 315.

The received data 317 is data that is the transmission data 316 received from another game apparatus 2 and that is data stored so as to be identifiable for each other game apparatus (that is, such that the transmission source thereof is identifiable).

In addition, various kinds of data to be used in the game processing are stored as necessary in the storage section 22. For example, modeling data indicating the appearances of each player character and each spectator, etc., are stored.

[Details of Processing Executed by Processor 21]

Next, the game processing according to the exemplary embodiment will be described in detail. Here, processing in the case of playing a match in the form of user vs. user (performing a competitive play by two users) will be mainly described.

FIG. 10 is a flowchart showing the details of the game processing. For example, the execution of the game processing is started when the user performs an operation of instructing a competitive play in a predetermined menu screen. This flowchart is merely an example of the processing. Therefore, the order of each process step may be changed as long as the same result is obtained. In addition, the values of variables and thresholds used in determination steps are also merely examples, and other values may be used as necessary.

In FIG. 10, first, in step S1, the processor 21 executes a match preparation process. This process is a process of performing various kinds of preparation for starting a match. FIG. 11 is a flowchart showing the details of the match preparation process. In FIG. 11, first, in step S11, the processor 21 executes a process for determining an opponent user. Here, the case where users play against each other will be described as an example, but the user may select a CPU as an opponent, or CPUs may play against each other. In the case where users play against each other, a process of determining the users participating in the match (here, a total of two users) is executed through a predetermined matching process via the server, a process of inviting a friend, or the like. Then, the processor 21 stores information (belonging club, etc.) regarding the determined participating user (hereinafter, referred to as opponent), information indicating information (network address information, or the like) for identifying the game apparatus 2 used by the opponent, etc., as the match status control data 311.

Next, in step S12, the processor 21 executes a process of determining a stadium to be used for the match. Here, for example, the following process is executed. First, the processor 21 identifies the virtual club to which the opponent belongs, on the basis of the match status control data 311. Next, the processor 21 acquires the home stadium data 225 related to the virtual club of the opponent, from the server. Next, the processor 21 generates a stadium list image on the basis of the data of the home stadium of the user, the data of the home stadium of the opponent, and the default stadium data 306, and displays the stadium list image on the display unit 5. Then, the processor 21 waits for a selection operation from the user. Then, when the user performs an operation of selecting two stadiums to be used from the stadium list, the two stadiums are determined as stadiums to be used, on the basis of the content of the operation. Here, the case where the home stadiums of the user and the opponent are selected will be described as an example. As for a selection operation, the user may select two stadiums by themselves, or the user and the opponent may perform an operation of selecting one stadium in turn.

Next, in step S13, the processor 21 executes a process of combining the selected two home stadiums to create the above combined stadium. For example, the processor 21 creates a home stadium object composed of only a right half, on the basis of the home stadium data 225 and the right half structure data 227 of the user. Furthermore, the processor 21 creates a home stadium object composed of only a left half, on the basis of the home stadium data 225 and the left half structure data 228 of the opponent. Then, the processor 21 combines both home stadium objects to create one combined stadium object, and stores the combined stadium object as the combined stadium data 313. In this case, the home stadium objects are combined such that the center portions of the above fields in the cross-sectional portions of the respective stadiums are adjacent to each other on the same coordinate axis. Since the sizes of the fields of the respective stadiums are the same as described above, even if any stadiums are combined, the field portions are not misaligned, and a field having a common size is created.

Next, in step S14, the processor 21 places various objects in a virtual space (for playing the match). Specifically, the processor 21 places player characters on the field of the combined stadium. In addition, the processor 21 also places spectators on the spectator seats (spectator placement region) of each home stadium related to the combined stadium. In this case, the processor 21 selects and places the kind of spectators corresponding to the stadium rank. As described above, the higher the stadium rank, the larger the scale of the spectator seats, and spectators are placed such that all the seats are always filled. As a result, spectators whose number corresponds to the level of each stadium rank are placed. Therefore, there may be a difference in the number of spectators between the two stadiums forming the combined stadium. In addition, the processor 21 also places various objects such as a ball and referee characters as appropriate. Moreover, along with this, the processor 21 also performs a process of initializing various kinds of data to be used during the match.

Next, in step S15, the processor 21 also displays the above-described stadium combining representation on the basis of the combined stadium data 313. That is, the processor 21 causes a half portion of the home stadium of the user and a half portion of the home stadium of the opponent to emerge at positions separated from each other in the virtual space. Furthermore, the processor 21 moves the half portions closer to each other. Then, the processor 21 displays, on the display unit 5, a representation in which one combined stadium is completed when the cross-sectional portions come into contact with each other.

Next, in step S16, the processor 21 displays a predetermined representation for announcing the start of the match (subsequent to the stadium combining representation). After the display of the match start representation is completed, the match preparation process ends, and the match is started.

Referring back to FIG. 10, next, in step S2, the processor 21 executes a match control process. FIG. 12 is a flowchart showing the details of the match control process. First, in step S21, the processor 21 executes an item throw-in control process. This process is a process for controlling the above-described throw-in of the items.

FIG. 13 is a flowchart showing the details of the item throw-in control process. First, in step S31, the processor 21 calculates the next item throw-in timing for each team (virtual club) on the basis of the stadium rank data 226 and the degree-of-enthusiasm control data 312. The method of the calculation may be any method, but for example, the processor 21 calculates the above initial throw-in interval on the basis of the stadium rank data 226. Then, the processor 21 determines the next throw-in timing by shortening this interval by a predetermined time according to the current degree of enthusiasm.

Since the throw-in interval is different depending on the stadium rank as described above, when home stadiums having different ranks are combined with each other, the item throw-in interval may be different for each virtual club.

Next, in step S32, the processor 21 determines whether the above next throw-in timing has come, on the basis of information of the match elapsed time included in the match status control data 311. As a result of the determination, if the next throw-in timing has not come (NO in step S32), the processor 21 ends the item throw-in control process. On the other hand, if the next throw-in timing has come (YES in step S32), in step S33, the processor 21 selects one item to be thrown, by random selection on the basis of the item master data 307 and the random selection table 308. In this case, the processor 21 may refer to, for example, the scores or the like on the basis of the match status control data 311, and may perform adjustment such that an item having an effect advantageous for the virtual club that is at a disadvantage in the development of the match at that time is likely to be selected by random selection. For example, the processor 21 may perform adjustment in which the rate of selection of each exclusive item is temporarily doubled.

Next, in step S34, the processor 21 generates an item box containing the selected item, and determines a position to which the item box is to be thrown. In the exemplary embodiment, as described above, the processor 21 determines the position of a player character belonging to the supporting club of a spectator who is to throw the item box, or a position near this player character, as the thrown position.

Next, in step S35, the processor 21 executes a process of throwing the item box from a spectator seat (a predetermined position in the spectator placement region) toward the determined thrown position. For example, the processor 21 executes a process of moving the item box so as to draw a parabolic line, with the position of a predetermined spectator seat as a starting point and the thrown position as a target point. Since item throw-in control is performed for each of the two virtual clubs playing against each other as described above, two item boxes (one related to the virtual club of the user, one related to the virtual club of the opponent) may be thrown at the same time depending on the timing.

This is the end of the item throw-in control process.

Referring back to FIG. 12, next, in step S22, the processor 21 performs control of the movement of the player characters. Specifically, the following process is performed. First, the processor 21 acquires the operation data 315. Next, the processor 21 controls the movement of one player character of the own team that is the current operation target, on the basis of the operation content. In addition, the processor 21 controls the other player characters of the own team by AI. Next, the processor 21 generates the transmission data 316 including the operation data 315, and transmits the transmission data 316 to the game apparatus 2 of the opponent. Next, the processor 21 receives data including the operation data 315 of the opponent, from the game apparatus 2 of the opponent, and stores the data as the received data 317. Then, the processor 21 controls the movement of the player characters of the opponent on the basis of the received data 317.

Next, in step S23, the processor 21 performs control of the movement of the ball. Specifically, the processor 21 moves the ball on the basis of movement parameters (movement direction, movement speed, etc.) which are set in association with the ball.

Next, in step S24, the processor 21 performs various types of collision determination and game processing based on the result of the determination. Specifically, at least the following three types of collision determination and game processing are performed.

First, collision determination is performed for the ball. That is, a process of, when the ball collides with a player character or the like (for example, dribbling, passing, shooting, etc.), setting the movement parameters of the ball on the basis of the content of the collision, is executed.

Next, determination of collision between player characters is performed. For example, this determination is for the case where a player character tackles another player character. In this case as well, parameters for controlling the movement of the player characters are set as appropriate on the basis of the result of the collision. For example, various parameters for performing movement control in which the player character is blown away is performed.

Furthermore, a collision (contact) with the above item box or item is also determined. In this case, if there is a collision with the item box, a process of causing the above selected item to emerge on this spot and causing the player character that has collided with item (the team to which the player character belongs) to acquire the item is also performed.

As described above, various types of collision determination are performed, and game processing based on the result of the determination is executed as appropriate.

Next, in step S25, the processor 21 executes other game processing that is not based on the result of the above collision determination. In the exemplary embodiment, at least the following processes are performed.

First, a process related to a change in the degree of enthusiasm is executed. The processor 21 determines whether a predetermined condition for increasing the degree of enthusiasm has been achieved. If the predetermined condition has been achieved, the processor 21 increases the degree of enthusiasm by a predetermined value on the basis of what has been achieved and the stadium rank of the virtual club that has achieved the condition, and updates the degree-of-enthusiasm control data 312.

Furthermore, a process related to the use of the acquired item is also executed. Specifically, when an item use operation is performed by the user, the processor 21 performs a process of causing a predetermined effect corresponding to the item that is instructed to be used.

Furthermore, a process of score determination is also executed. That is, the processor 21 performs a process of determining whether the ball has moved into a goal frame, and giving a score to one of the virtual clubs according to the content of the determination (updating the match status control data 311).

In addition, processes such as control of a spectator's cheering motion, setting of the virtual camera control data 314, and sound reproduction control are also executed. Here, the spectator's cheering motion may be changed according to the above degree of enthusiasm. For example, the spectators are caused to make a more intense cheering motion when the degree of enthusiasm is higher than when the degree of enthusiasm is lower. Accordingly, a state where the spectators become more excited as the degree of enthusiasm increases is presented, so that the user is allowed to experience a sense of unity with the spectators.

Next, in step S26, the processor 21 generates a game image reflecting the above processing contents, and outputs the game image to the display unit 5. This is the end of the match control process.

Referring back to FIG. 10, next, in step S3, the processor 21 determines whether a match end condition has been satisfied, on the basis of the match status control data 311. For example, it is determined whether the match time has ended. As a result of the determination, if the match end condition has not been satisfied (NO in step S3), the processor 21 returns to step S2 and repeats the process. On the other hand, if the match end condition has been satisfied (YES in step S3), the processor 21 executes a match end process in step S4.

FIG. 14 is a flowchart showing the details of the match end process. In FIG. 14, first, in step S41, the processor 21 calculates an amount of the in-game currency to be given to each of the virtual clubs playing against each other, on the basis of the result of the match. Then, the processor 21 gives the calculated amount of the in-game currency to each virtual club (updates the owned currency data 224).

Next, in step S42, the processor 21 performs stadium rank unlocking control. That is, the processor 21 determines whether an unlocking condition for a higher rank has been satisfied for each of the clubs playing against each other this time, as a result of the match. If the unlocking condition has been satisfied, the processor 21 performs a process of unlocking a higher rank. In addition, along with this, the processor 21 updates the stadium rank data 226 to the higher rank. Accordingly, the user is allowed to purchase stadium parts for the higher rank. In this case, the processor 21 may display a predetermined representation showing that the stadium rank has been raised.

Next, in step S43, the processor 21 displays a match end representation on the display unit 5. This is the end of the match end process.

This is the end of the detailed description of the game processing according to the exemplary embodiment.

As described above, in the exemplary embodiment, the virtual clubs created by the users can play against each other. In addition, the growth element of stadium rank is set for the home stadium of each virtual club. Furthermore, the user is allowed to purchase spectator seats on which spectators are to be placed, as the stadium parts. As for the spectator seats, by raising the stadium rank, it is possible to purchase spectator seats on which more spectators can be placed. Moreover, the spectators throw items each of which causes an effect advantageous in the game, at a predetermined time interval, and the throw-in interval is shortened as the stadium rank is raised. Therefore, by raising the stadium rank, it is possible to increase chances of using such items, which can make it easier to advantageously advance the game. Accordingly, it is possible to provide enjoyment and motivation to grow the stadium (virtual club), and enhance the entertainment characteristics of the game. In addition, it is possible to present the relationship in which it is made easier to advantageously advance the game by increasing the number of spectators who support the own club, so that the user is allowed to experience the benefits of having more spectators (supporters) for the own club, or a sense of unity with the spectators. Accordingly, it is possible to further enhance the entertainment characteristics as a sports game, and provide the fun of growing the virtual club, to the user.

In the exemplary embodiment, a combined stadium obtained by combining two stadiums is used for a match. Accordingly, for example, when different virtual clubs play against each other, a match can be played in a combined stadium obtained by combining the home stadiums of the virtual clubs. In addition, since the above item throw-in interval is controlled for each of the stadium ranks of the respective clubs, an effect corresponding to the home stadium of each club can be caused or given. Furthermore, in the exemplary embodiment, the stadium combining representation is presented to the user before the match. Accordingly, it is possible to provide a fun way to show home stadiums customized by the respective clubs to each other in a series of operations for playing the match. In addition, it is also possible to cause the user to check the stadium rank of the opponent before the match.

[Modifications]

In the above embodiment, the example in which the content selected as the above item box is not affected by the stadium rank has been described. In another exemplary embodiment, the item to be thrown may be changed according to the stadium rank. For example, there may be an item that is not thrown (selected) at stadium rank 1 but can be thrown at stadium rank 4.

Even if the item is the same (at least in appearance), the amount of the effect and the magnitude of the effect thereof may be changed according to the stadium rank. For example, an item that temporarily increases the movement speed of the player characters is assumed as an example of such an item. In this case, an amount by which the movement speed is increased by an item thrown at stadium rank 4 may be larger than that by an item thrown at stadium rank 1. Accordingly, it is possible to more advantageously advance the match as the stadium rank is raised.

In still another exemplary embodiment, the performance of the player characters may be changed according to a win-loss record between virtual clubs. For example, if the cumulative number of wins exceeds a predetermined threshold, then a predetermined value may be added to the "movement speed" parameter for the player characters of the virtual club. Accordingly, when the win-loss record becomes better, it is possible to more advantageously advance the match.

In the above embodiment, as for the stadium rank, the example in which a higher rank is unlocked and the stadium rank is automatically raised if the unlocking condition for a higher rank has been satisfied, has been described. In another exemplary embodiment, even if the unlocking condition for a higher rank (stadium rank update condition) has been satisfied, the stadium rank may not necessarily be updated immediately, and may be updated at a predetermined timing on the basis of a predetermined operation by the user. For example, in exchange for consumption of a predetermined amount of the in-game currency, a higher rank may be unlocked and the stadium rank may be updated.

In the above embodiment, the example in which, by unlocking a higher rank, it becomes possible to purchase the stadium parts corresponding to the unlocked rank, has been described. In another exemplary embodiment, even in a state where a higher rank has been unlocked, it may be possible to purchase stadium parts corresponding to a rank higher than the current rank. In this case, such a stadium part can be purchased, but it may be made impossible to use the stadium part until the stadium rank corresponding to this stadium part is reached.

In still another exemplary embodiment, in addition to the above-described stadium rank, data indicating a "club rank"

that indicates the rank of the club itself may be used. The club rank may be raised on the basis of, for example, a win-loss record (number of wins). In this case, the stadium rank data 226 and the data indicating the club rank may be stored in association with each other. Then, according to the club rank, the stadium rank may be updated, or may be brought into a state of being updatable on the basis of an operation by the user.

As for stadium combining, in another exemplary embodiment, when a combined stadium is a combination of specific stadiums, a special effect may be caused, or a special representation may be presented, as special combining. For example, when stadiums to which the same "theme" is applied are combined with each other to create a combined stadium, a special representation display may be performed in the stadium combining representation, or special BGM may be reproduced in the match start representation. Even between stadiums having the same "theme", stadium parts such as spectator seat objects or spectator objects associated with the respective stadiums may be different. In addition, even when a stadium to which a "theme A" is applied and a stadium to which a "theme B" is applied are combined to create a combined stadium, if the combination of these stadiums is a combination that is defined in advance as special combining, a special representation display may be performed in the stadium combining representation, or special BGM may be reproduced in the match start representation. Furthermore, as for the items to be thrown, special items that are to be thrown only in a combined stadium obtained through such special combining may also be provided.

As for the home stadium, items to be thrown (that is, effects to be caused) may be selectable to some extent by the user. For example, items to be thrown may be purchasable as one type of the stadium parts, using the in-game currency. Furthermore, a predetermined item to be thrown may be able to be designated as an object to be actually thrown during a match, from among purchased items to be thrown. Accordingly, items to be thrown can be different for each of the home stadiums of the respective virtual clubs, and each home stadium can have an individual character.

As for the default stadiums, the type of items to be thrown may be different for each default stadium. That is, at least some of the items to be thrown may be specific items defined for each default stadium.

In the above embodiment, the example in which, in combining stadiums, stadiums having a half size are combined with each other, has been described. That is, the example in which stadiums having a size of 50% are combined with each other has been described. In another exemplary embodiment, the stadium combining is not limited to combining stadiums at a ratio of 50%, and for example, stadiums may be combined such that the ratio of one of the stadiums is 75% and the ratio of the other of the stadiums is 25%.

In the above embodiment, the case of combining two stadiums has been described as an example. However, in another exemplary embodiment, three or more stadiums may be combined. For example, in the case of combining four stadiums, a part of each stadium may be extracted and combined such that the ratio of each stadium is 25%. The number of stadiums to be designated in combining may be a number corresponding to the number of users (or virtual clubs) participating in the game. As for stadium designation, for example, in the case where four users perform a competitive play, each user may be allowed to designate one stadium, or one user may designate a plurality of stadiums.

As for the item throw-in interval, in the above embodiment, the example in which the item throw-in interval is adjusted in consideration of the "degree of enthusiasm" in addition to the stadium rank has been described. In another exemplary embodiment, the parameter of such a "degree of enthusiasm" does not necessarily have to be used. For example, the number of times a predetermined play defined in advance as the above-described degree-of-enthusiasm increase condition is performed may be counted, and control may be performed such that the item throw-in interval is further shortened when the counted number exceeds a predetermined threshold. That is, the item throw-in interval may be adjusted on the basis of the execution status of the predetermined play.

In the above embodiment, the ball game in which a ball is placed into goal frames, such as soccer has been described as an example, but the above processing may be applied to ball games that do not use goal frames as described above. For example, the above processing may be applied to a game whose concept is baseball. In this case, as for the combined stadium, a ballpark does not have the concept of an own team site and an opponent team site, but for example, ballparks may each be divided into two equal parts along a predetermined direction, and one equal part of each ballpark may be combined with each other to create a "combined ballpark". In addition, as an equivalent to the above virtual club, the user may create a "virtual baseball team", and may be enabled to belong to a "virtual baseball team".

The combined stadium may be applied to games other than ball games. For example, the combined stadium may be applied to a competitive game in which characters grown by users compete against each other in a stadium. Also, for example, the combined stadium may be applied to a competitive game whose concept is a martial art and in which a place equivalent to the above stadium is selectable as a competing place (stage) from among a plurality of places.

In the above embodiment, the case where a series of game processes for a match are performed in the single game apparatus 2 has been described. However, in another embodiment, the above series of processes may be performed in an information processing system that includes a plurality of information processing apparatuses. For example, in an information processing system that includes a terminal side apparatus and a server side apparatus capable of communicating with the terminal side apparatus via a network, a part of the series of processes may be performed by the server side apparatus. Alternatively, in an information processing system that includes a terminal side apparatus and a server side apparatus capable of communicating with the terminal side apparatus via a network, a main process of the series of processes may be performed by the server side apparatus, and a part of the series of processes may be performed by the terminal side apparatus. Still alternatively, in the information processing system, a server side system may include a plurality of information processing apparatuses, and a process to be performed in the server side system may be divided and performed by the plurality of information processing apparatuses. In addition, a so-called cloud gaming configuration may be adopted. For example, the game apparatus 2 may be configured to send operation data indicating a user's operation to a predetermined server, and the server may be configured to execute various kinds of game processing and stream the execution results as video/audio to the game apparatus 2.

While the exemplary embodiments have been described in detail, the foregoing description is in all aspects illustrative and not restrictive. It is to be understood that numerous other modifications and variations can be devised without departing from the scope of the exemplary embodiments.

What is claimed is:

1. A game processing method executed by a processor configured to control a processing system, the game processing method causes the processing system to execute a competitive sports game in which a team of a first club that at least one user joins and a team of a second club are caused to compete against each other and in which at least the first club is associated with a rank that is information regarding a degree of growth of the club, the game processing method causing the processing system to:

execute the competitive sports game such that an advantageous effect corresponding to a level of the rank is given to the team of the first club during play of the competitive sports game, where execution of the competitive sports game comprises causing an item to emerge during play of the competitive sports game to give the advantageous effect and the item emerges at an emergence frequency corresponding to the level of the rank.

2. The game processing method according to claim 1, wherein the information regarding the degree of growth of the club is information regarding a scale of a stadium in which the team of the first club and the team of the second club compete against each other.

3. The game processing method according to claim 2, wherein a stadium part corresponding to the rank is enabled to be associated with the stadium, and wherein the execution of the competitive sports game comprises causing the team of the first club and the team of the second club to compete against each other in a stadium object corresponding to the stadium associated with the stadium part.

4. The game processing method according to claim 3, wherein the stadium part includes at least one spectator object placed on a spectator seat, and wherein the execution of the competitive sports game comprises placing the spectator objects whose number corresponds to a level of the rank, in the stadium object and where the competitive sports game is played with the spectator objects in the stadium object.

5. The game processing method according to claim 3, wherein the stadium part includes a spectator seat object on which at least one spectator is placed, and wherein the execution of the competitive sports game comprises placing the spectator seat object whose scale corresponds to a level of the rank, in the stadium object and where the competitive sports game is played with the spectator seat object in the stadium object.

6. The game processing method according to claim 1, wherein the execution of the competitive sports game comprises causing the item to emerge at an emergence frequency based on an execution state of a predetermined play performed by a character of the team of the first club during play of the competitive sports game and the level of the rank.

7. The game processing method according to claim 1, wherein the item is an item that improves performance of a character of the team of the first club or obstructs movement of a character of the team of the second club.

8. The game processing method according to claim 1, wherein the item is an item that is usable by both teams, and wherein the execution of the competitive sports game comprises causing the item to emerge at a position closer to a character of the team of the first club than to a character of the team of the second club in a stadium object during play of the competitive sports game.

9. The game processing method according to claim 1, wherein the execution of the competitive sports game comprises controlling a character of the team of the first club at least on a basis of an ability parameter corresponding to the level of the rank during play of the competitive sports game.

10. The game processing method according to claim 1, wherein the execution of the competitive sports game comprises controlling a character of the team of the first club at least on a basis of an ability parameter corresponding to a win-loss record of the club during play of the competitive sports game.

11. The game processing method according to claim 1, the competitive sports game is a competitive sports game in which each of a character of the team of the first club and a character of the team of the second club places a predetermined object into a goal placed in a site for an opponent team.

12. A computer-readable non-transitory storage medium having stored therein instructions that cause a processor of an information processing apparatus, which executes a competitive sports game in which a team of a first club that at least one user joins and a team of a second club are caused to compete against each other and in which at least the first club is associated with a rank that is information regarding a degree of growth of the club, to:

execute the competitive sports game such that an advantageous effect corresponding to a level of the rank is given to the team of the first club during play of the competitive sports game, wherein the instructions further cause the processor to:

give the advantageous effect by causing an item to emerge during play of the competitive sports game; and cause the item to emerge at an emergence frequency corresponding to the level of the rank.

13. The computer-readable non-transitory storage medium according to claim 12, wherein the information regarding the degree of growth of the club is information regarding a scale of a stadium in which the team of the first club and the team of the second club compete against each other.

14. The computer-readable non-transitory storage medium according to claim 13, wherein a stadium part corresponding to the rank is enabled to be associated with the stadium, and the instructions cause the processor to cause the team of the first club and the team of the second club to compete against each other in a stadium object corresponding to the stadium associated with the stadium part.

15. The computer-readable non-transitory storage medium according to claim 14, wherein the stadium part includes at least one spectator object placed on a spectator seat, and the instructions cause the processor to place the spectator objects whose number corresponds to a level of the rank, in the stadium object and execute game processing.

16. The computer-readable non-transitory storage medium according to claim 14, wherein the stadium part includes a spectator seat object on which at least one spectator is placed, and the instructions cause the processor to place the spectator seat object whose scale corresponds to a level of the rank, in the stadium object and execute game processing.

17. The computer-readable non-transitory storage medium according to claim 12, wherein the instructions further cause the processor to cause the item to emerge at an emergence frequency based on an execution state of a predetermined play performed by a character of the team of the first club during play of the competitive sports game and the level of the rank.

18. The computer-readable non-transitory storage medium according to claim 12, wherein the item is an item that improves performance of a character of the team of the first club or obstructs movement of a character of the team of the second club.

19. The computer-readable non-transitory storage medium according to claim 12, wherein the item is an item that is usable by both teams of the first team and the second team, and the instructions cause the processor to cause the item to emerge at a position closer to a character of the team of the first club than to a character of the team of the second club in a stadium object during play of the competitive sports game.

20. A game processing method executed by a processor configured to control a processing system, the game processing method causes the processing system to execute a competitive sports game in which a team of a first club that at least one user joins and a team of a second club are caused to compete against each other and in which at least the first club is associated with a rank that is information regarding a degree of growth of the club, the game processing method causing the processing system to:

execute the competitive sports game such that an advantageous effect corresponding to a level of the rank is given to the team of the first club during play of the competitive sports game, where the execution of the competitive sports game comprises controlling a character of the team of the first club at least on a basis of an ability parameter based on a win-loss record of the club during play of the competitive sports game.

21. The game processing method according to claim 20, wherein the information regarding the degree of growth of the club is information regarding a scale of a stadium in which the team of the first club and the team of the second club compete against each other.

22. The game processing method according to claim 21, wherein a stadium part corresponding to the rank is enabled to be associated with the stadium, and wherein the execution of the competitive sports game comprises causing the team of the first club and the team of the second club to compete against each other in a stadium object corresponding to the stadium associated with the stadium part.

23. The game processing method according to claim 22, wherein the stadium part includes at least one spectator object placed on a spectator seat, and wherein the execution of the competitive sports game comprises placing the spectator objects whose number corresponds to a level of the rank, in the stadium object and where the competitive sports game is played with the spectator objects in the stadium object.

24. The game processing method according to claim 22, wherein the stadium part includes a spectator seat object on which at least one spectator is placed, and wherein the execution of the competitive sports game comprises placing the spectator seat object whose scale corresponds to a level of the rank, in the stadium object and where the competitive sports game is played with the spectator seat object in the stadium object.

25. A computer-readable non-transitory storage medium having stored therein instructions that cause a processor of an information processing apparatus, which executes a competitive sports game in which a team of a first club that at least one user joins and a team of a second club are caused to compete against each other and in which at least the first club is associated with a rank that is information regarding a degree of growth of the club, to:

execute the competitive sports game such that an advantageous effect corresponding to a level of the rank is given to the team of the first club during play of the competitive sports game, where the execution of the competitive sports game comprises controlling a character of the team of the first club at least on a basis of an ability parameter based on a win-loss record of the club during play of the competitive sports game.

26. The computer-readable non-transitory storage medium according to claim 25, wherein the information regarding the degree of growth of the club is information regarding a scale of a stadium in which the team of the first club and the team of the second club compete against each other.

* * * * *